(12) United States Patent
Kim et al.

(10) Patent No.: US 11,561,447 B2
(45) Date of Patent: Jan. 24, 2023

(54) DECORATION MEMBER AND METHOD FOR PRODUCING SAME

(71) Applicant: LG CHEM, LTD., Seoul (KR)

(72) Inventors: Yong Chan Kim, Daejeon (KR); Ki Hwan Kim, Daejeon (KR); Nansra Heo, Daejeon (KR); Jeong Woo Shon, Daejeon (KR); Pilsung Jo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 299 days.

(21) Appl. No.: 16/768,622

(22) PCT Filed: Dec. 13, 2018

(86) PCT No.: PCT/KR2018/015814
§ 371 (c)(1),
(2) Date: May 29, 2020

(87) PCT Pub. No.: WO2019/117638
PCT Pub. Date: Jun. 20, 2019

(65) Prior Publication Data
US 2021/0173276 A1 Jun. 10, 2021

(30) Foreign Application Priority Data

Dec. 15, 2017 (KR) .......................... 10-2017-0173255

(51) Int. Cl.
*G02F 1/157* (2006.01)
*G02F 1/153* (2006.01)
(Continued)

(52) U.S. Cl.
CPC ............ *G02F 1/157* (2013.01); *G02F 1/1533* (2013.01); *G02F 1/1516* (2019.01);
(Continued)

(58) Field of Classification Search
None
See application file for complete search history.

(56) References Cited

U.S. PATENT DOCUMENTS 7,362,490 B2 * 4/2008 Park .................. G02F 1/155
359/245
7,923,122 B2 * 4/2011 Korechika .............. G02B 5/09
428/432

(Continued)

FOREIGN PATENT DOCUMENTS

EP          2 952 360 A1     12/2015
JP        2009-291966 A      12/2009
(Continued)

OTHER PUBLICATIONS

International Search Report from PCT/KR2018/015814, dated Mar. 19, 2019.
(Continued)

*Primary Examiner* — Ryan Crockett
(74) *Attorney, Agent, or Firm* — Dentons US LLP

(57) ABSTRACT

A decoration element including a color developing layer including a light reflective layer, a light absorbing layer provided on the light reflective layer, and a convex portion or concave portion having an asymmetric-structured cross-section; an electrochromic device provided on any one surface of the color developing layer; and an in-mold label layer provided on the other surface of the color developing layer.

15 Claims, 18 Drawing Sheets

(51) Int. Cl.
  *G02F 1/1524* (2019.01)
  *G02F 1/1516* (2019.01)
  *G02F 1/15* (2019.01)

(52) U.S. Cl.
  CPC .... *G02F 1/1524* (2019.01); *G02F 2001/1517* (2013.01); *G02F 2001/15025* (2019.01)

(56) References Cited

U.S. PATENT DOCUMENTS

| | | | | |
|---|---|---|---|---|
| 2009/0323162 A1* | 12/2009 | Fanton | ............ | G02F 1/1533 359/275 |
| 2010/0243427 A1* | 9/2010 | Kozlowski | ............ | G02F 1/1524 427/126.6 |
| 2011/0262713 A1 | 10/2011 | Nakoa et al. | | |
| 2011/0273906 A1* | 11/2011 | Nichol | ............ | G02B 6/0028 445/24 |
| 2020/0133088 A1 | 4/2020 | Gillaspie et al. | | |
| 2020/0165161 A1* | 5/2020 | Berlinguette | ......... | G02F 1/1525 |
| 2020/0355974 A1* | 11/2020 | Kim | .................. | B32B 3/30 |

FOREIGN PATENT DOCUMENTS

| | | | |
|---|---|---|---|
| JP | 2010-197798 A | | 9/2010 |
| JP | 2011-170295 A | * | 9/2011 |
| JP | 5016722 B2 | | 9/2012 |
| KR | 10-2008-0078523 A | | 8/2008 |
| KR | 10-2015-0086329 | * | 7/2015 |
| KR | 10-2015-0086329 A | | 7/2015 |
| KR | 10-2017-0086631 A | | 7/2017 |
| WO | 2015/032200 A1 | | 3/2015 |

OTHER PUBLICATIONS

Written Opinion of the ISA from PCT/KR2018/015814, dated Mar. 19, 2019.

* cited by examiner

[FIG. 1]
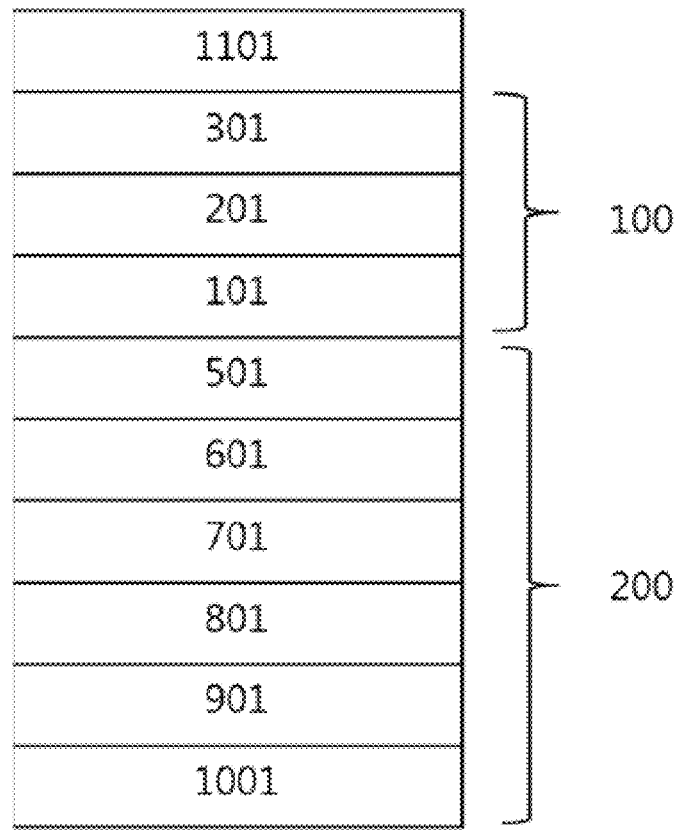
[FIG. 2]
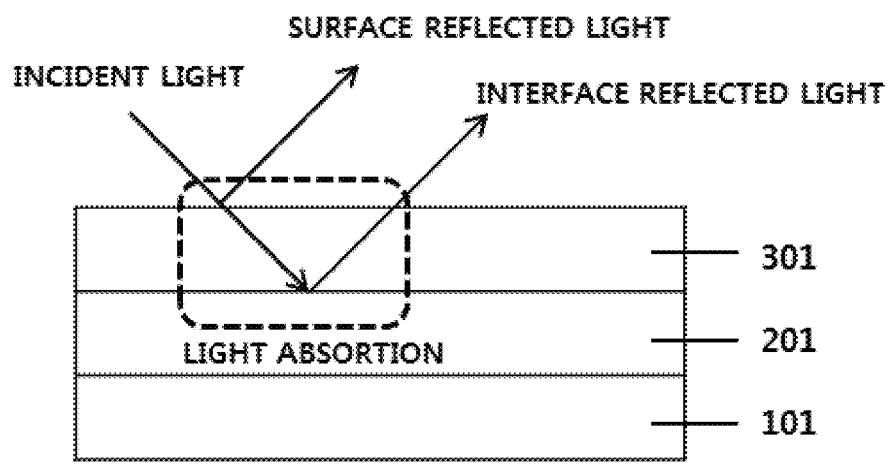

[FIG. 3]
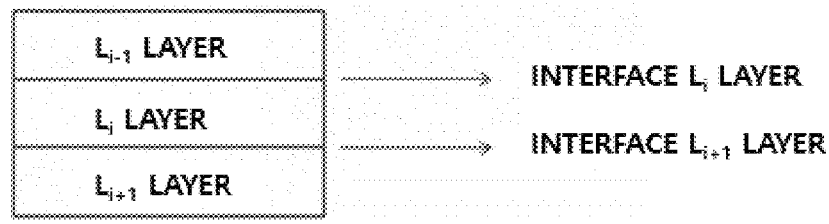
[FIG. 4]
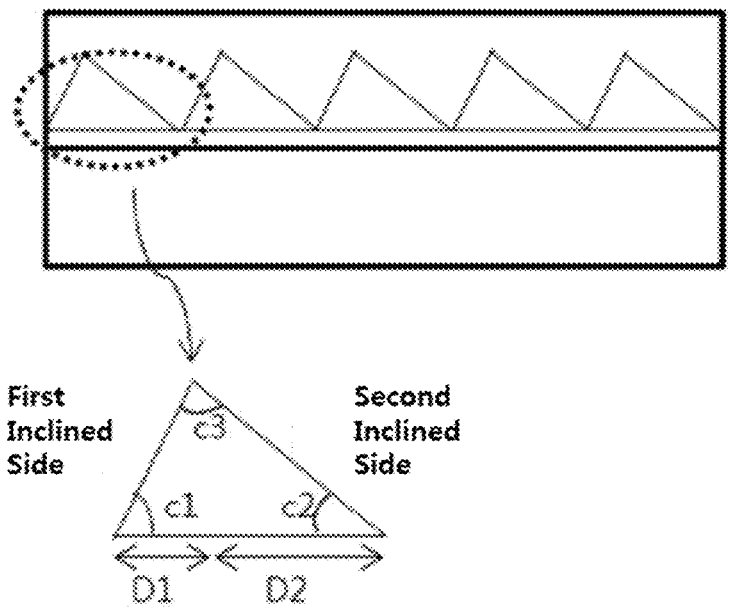
[FIG. 5A]
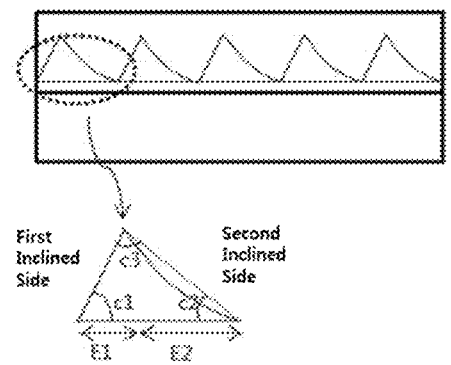
[FIG. 5B]
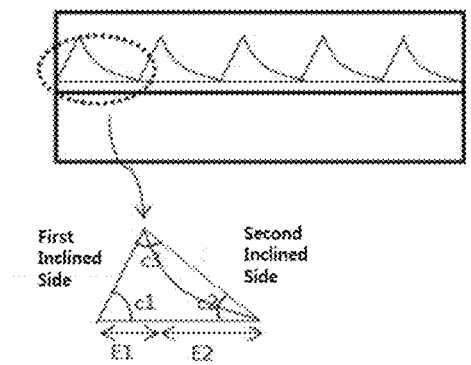

[FIG. 6]
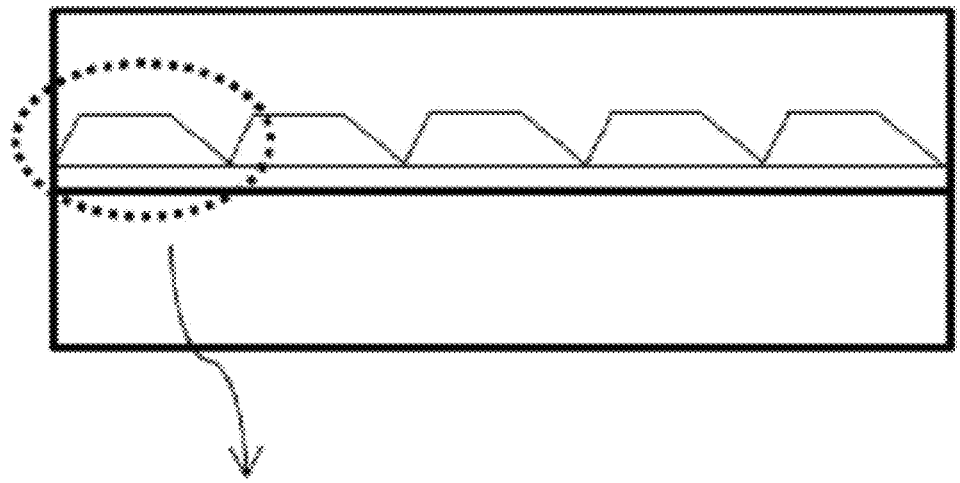
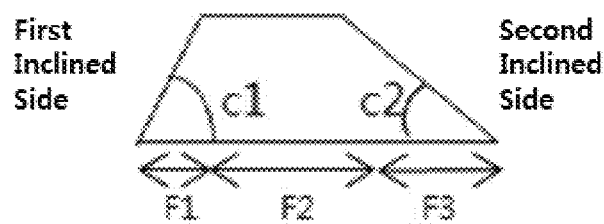
[FIG. 7A]
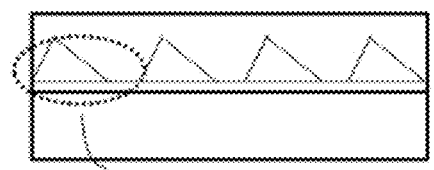
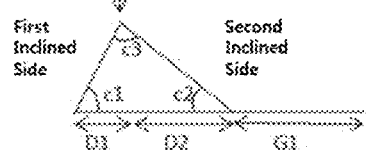
[FIG. 7B]
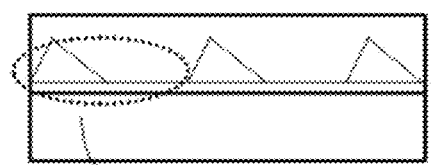
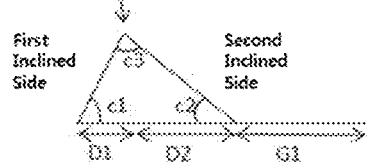

[FIG. 8]
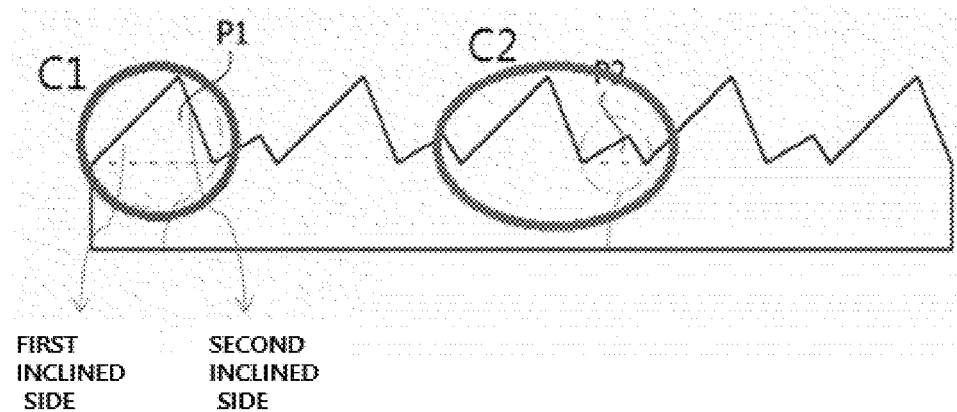
FIRST INCLINED SIDE   SECOND INCLINED SIDE
[FIG. 9]
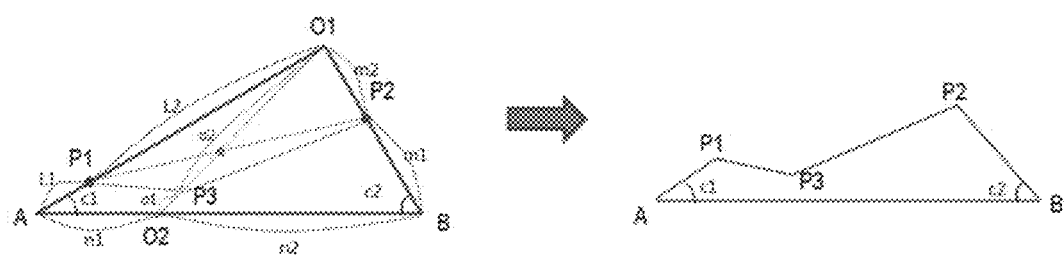
[FIG. 10A]
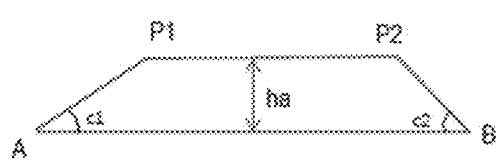
[FIG. 10B]
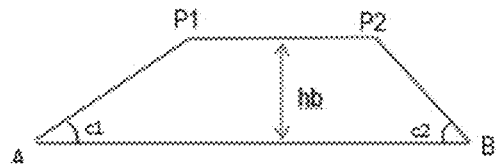

[FIG. 11]
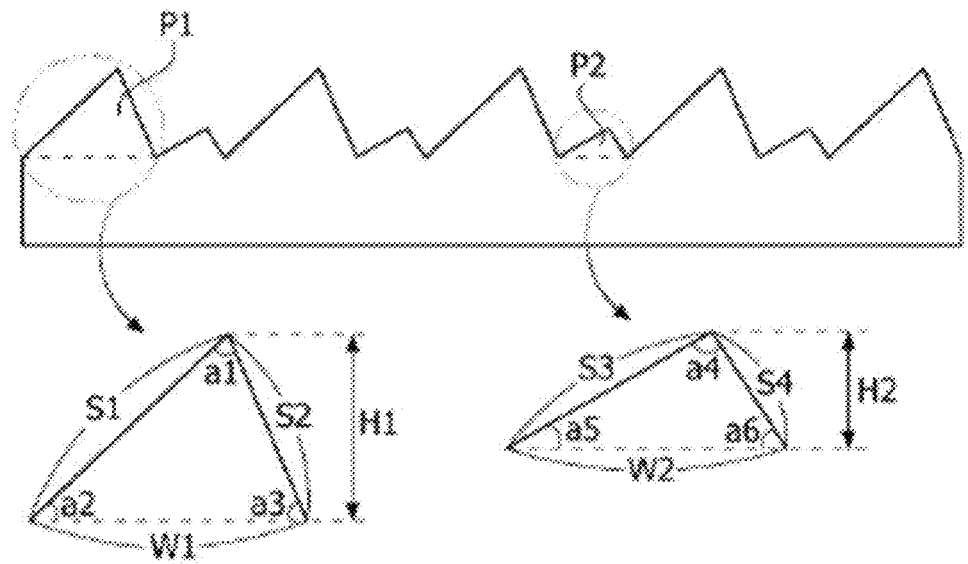
[FIG. 12]
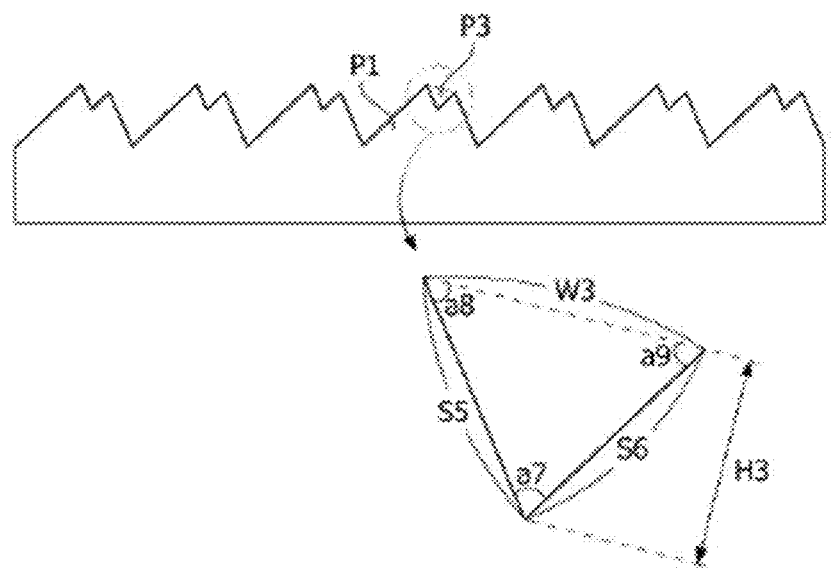

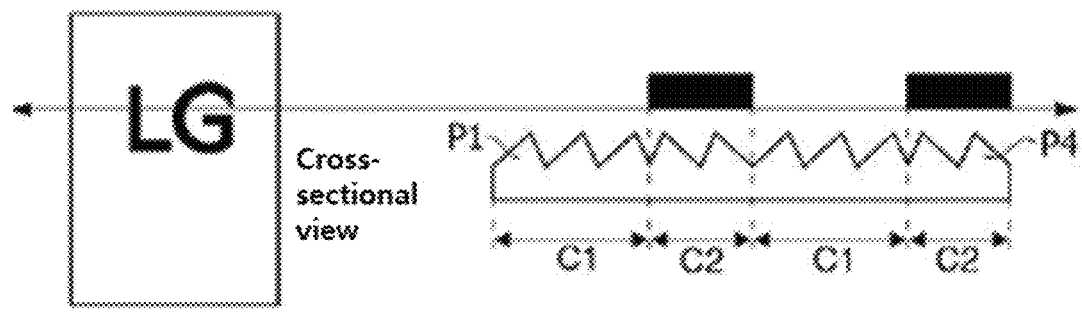
[FIG. 13A]
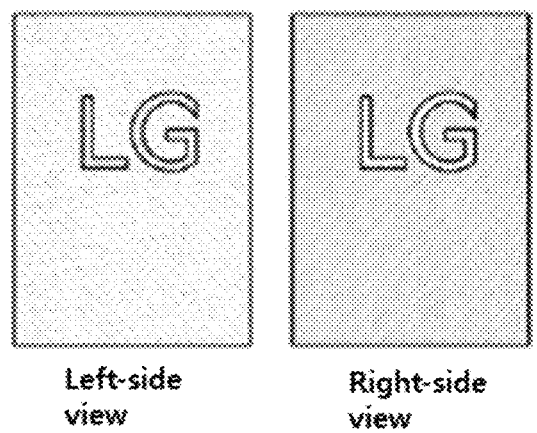
[FIG. 13B]
[FIG. 14]
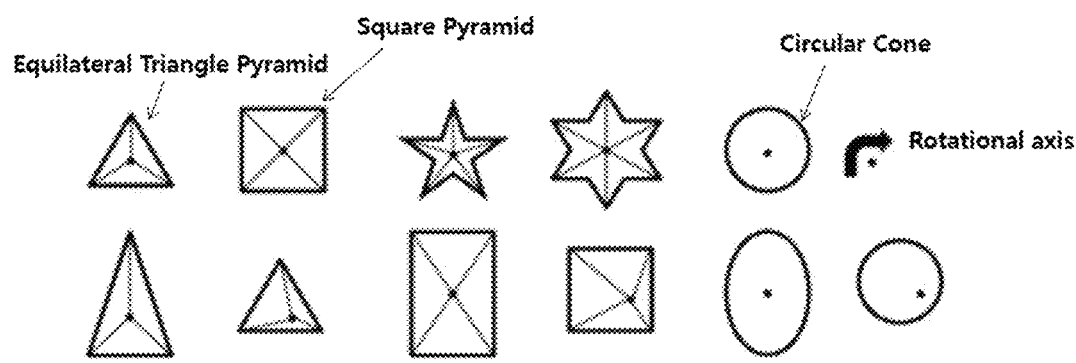

[FIG. 15]
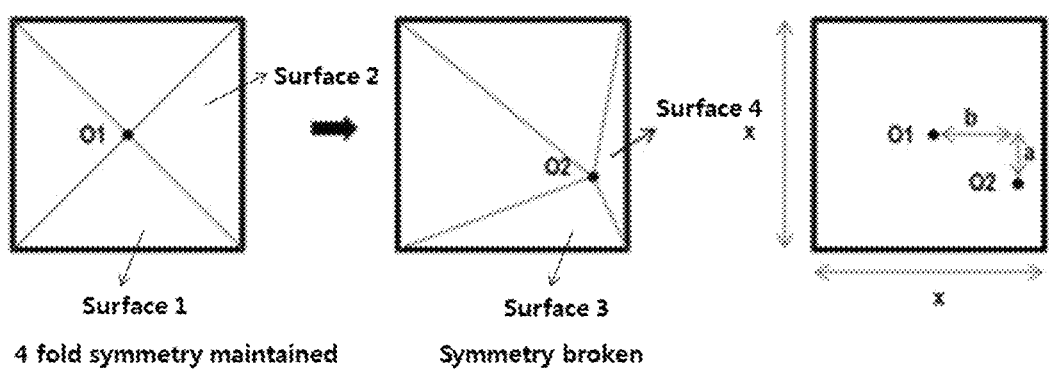
[FIG. 16A]
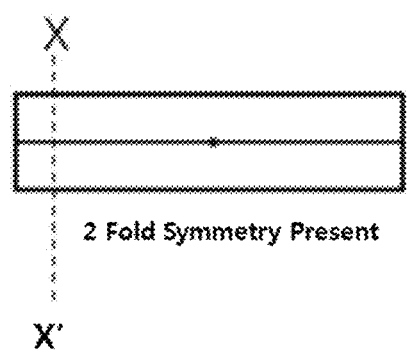
[FIG. 16B]
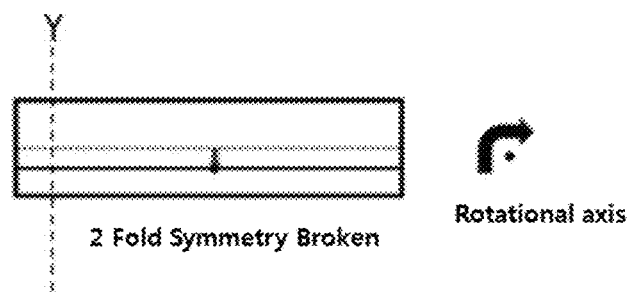
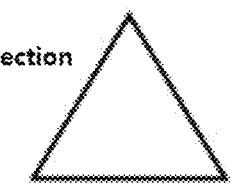
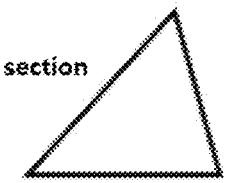

[FIG. 17]
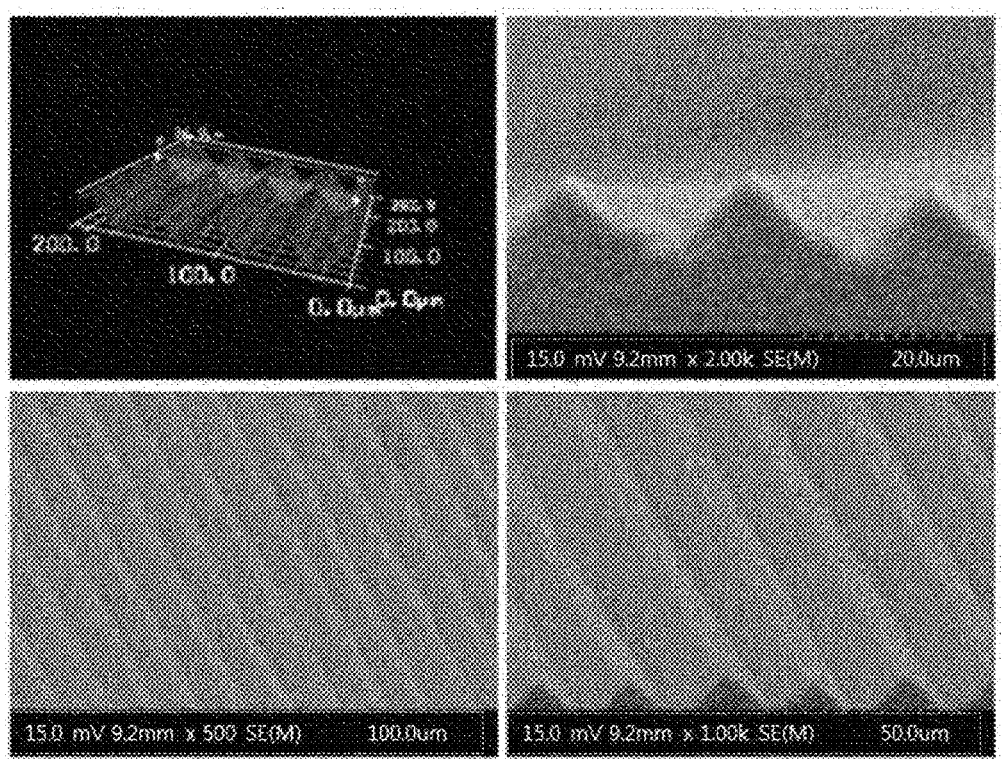
[FIG. 18]
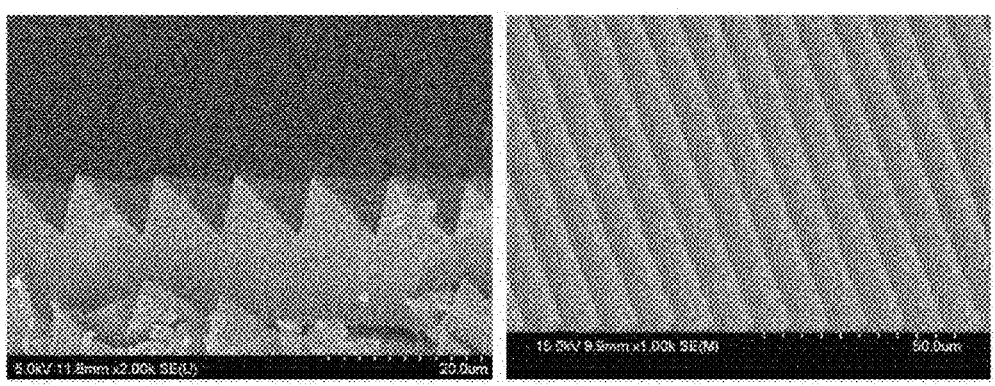

[FIG. 19]
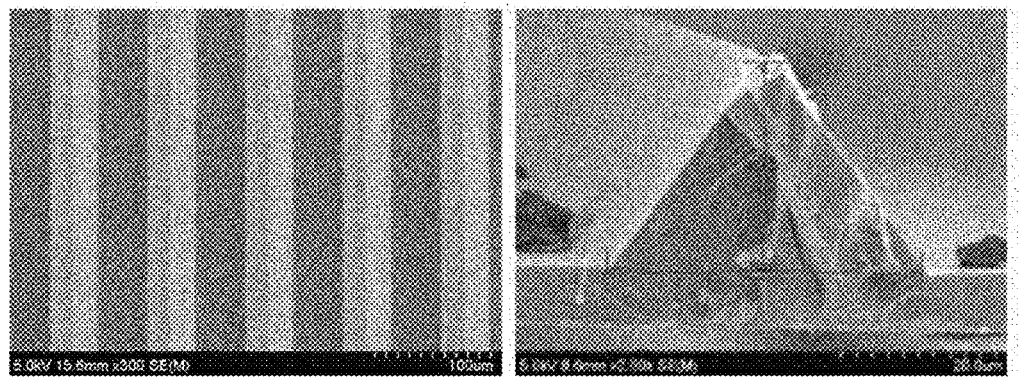
[FIG. 20]
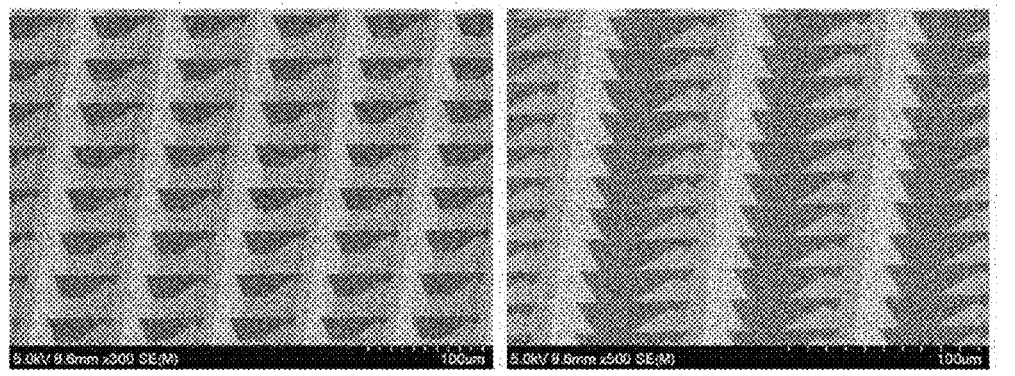

[FIG. 21A]    [FIG. 21B] 
[FIG. 21C]    [FIG. 21D]    [FIG. 21E] 
[FIG. 21F]    [FIG. 21G]    [FIG. 21H] 
[FIG. 21I] 
[FIG. 22]
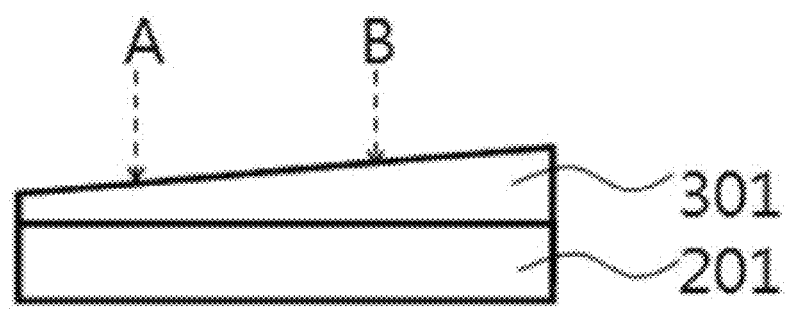

[FIG. 23]
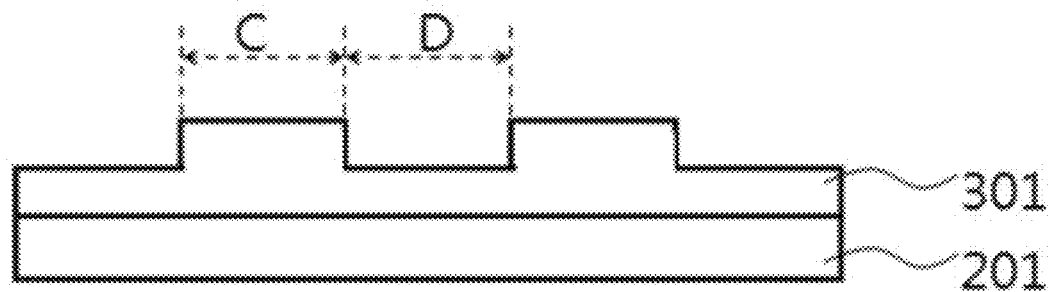
[FIG. 24]
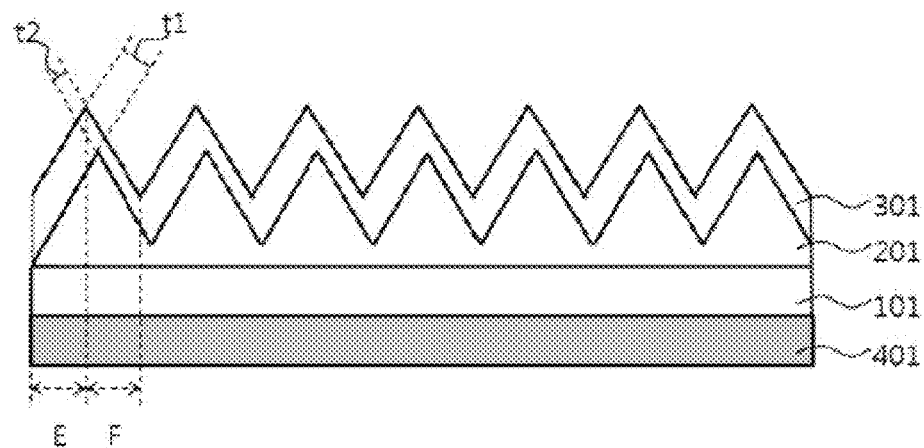
[FIG. 25]
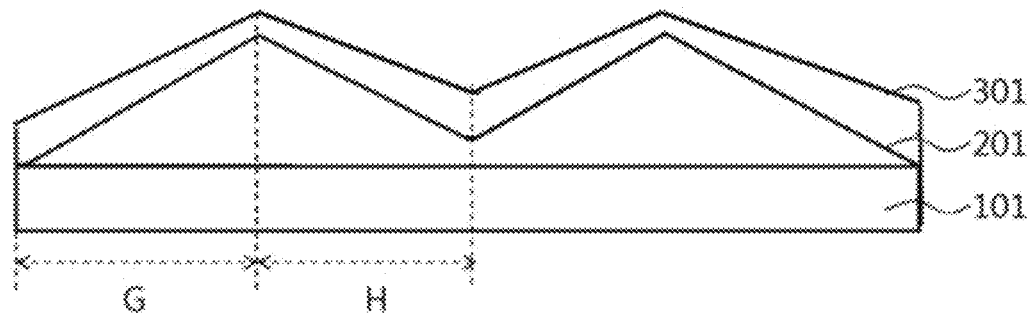

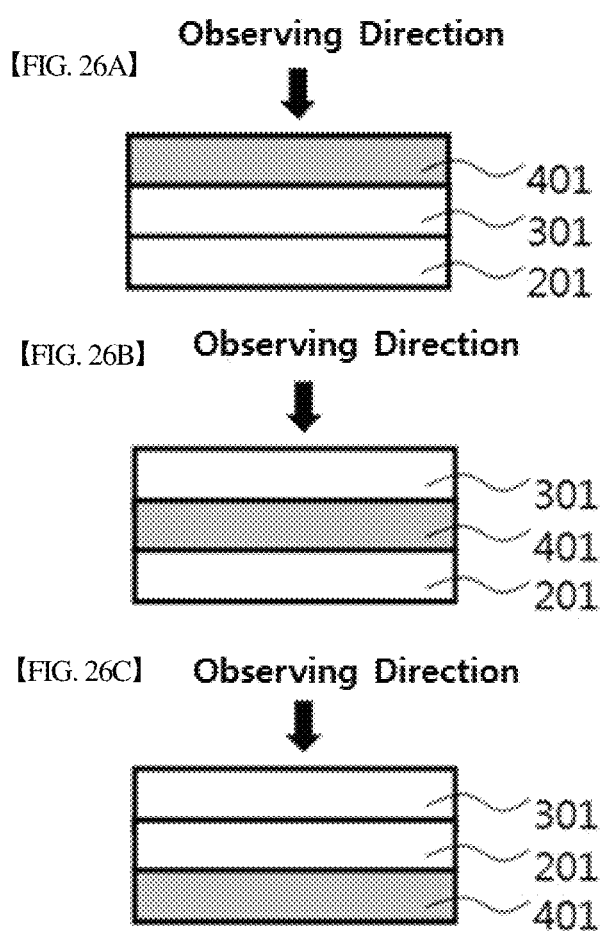

[FIG. 27A] 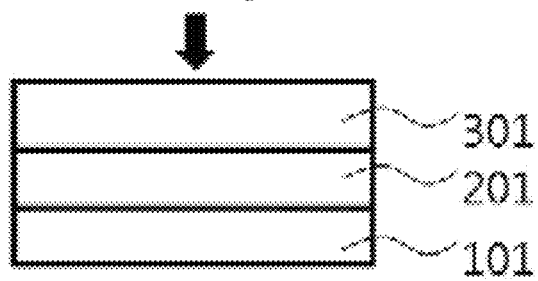
[FIG. 27B] 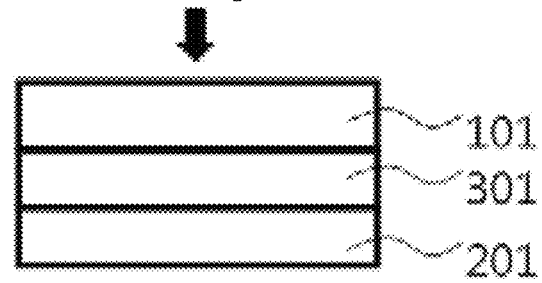

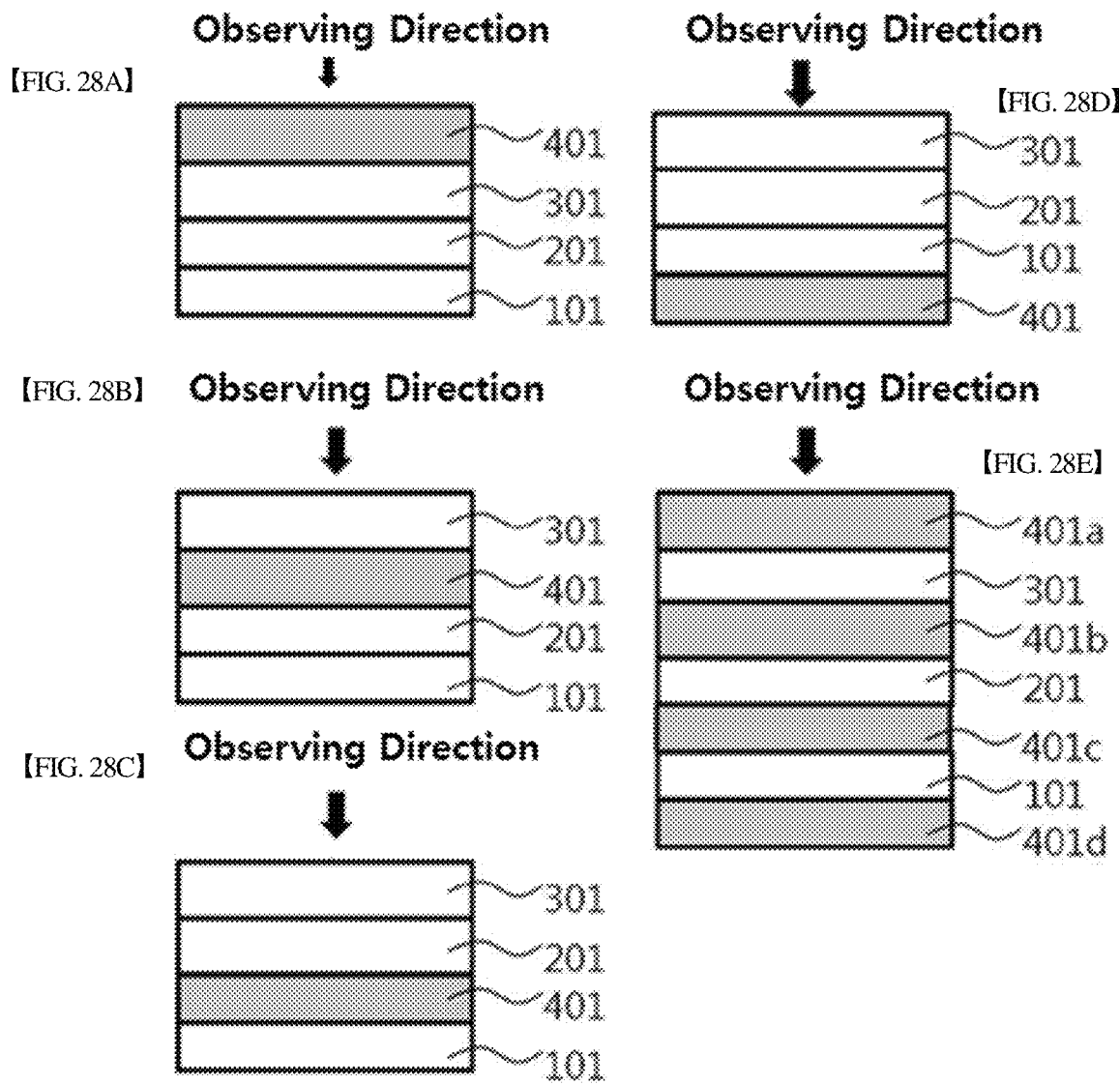

[FIG. 29A]
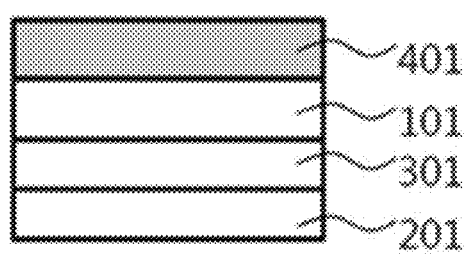
[FIG. 29B]
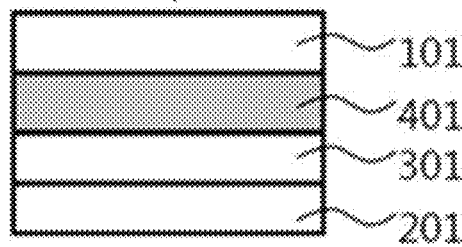
[FIG. 29C]
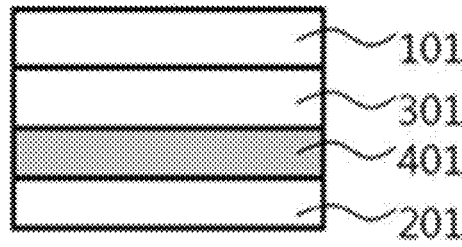
[FIG. 29D]
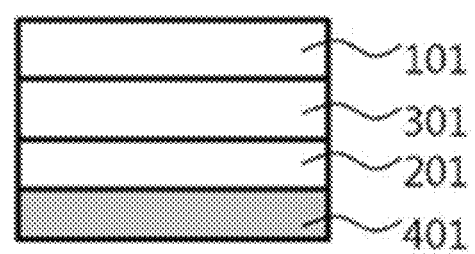
[FIG. 29E]
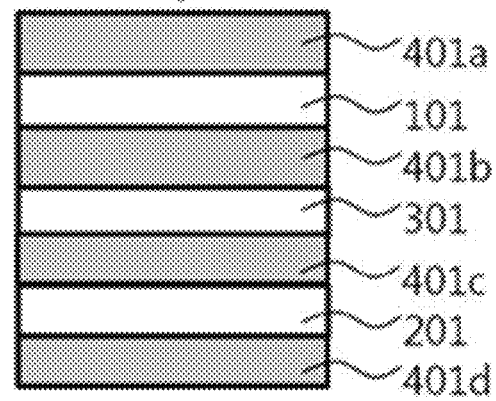

[FIG. 30]
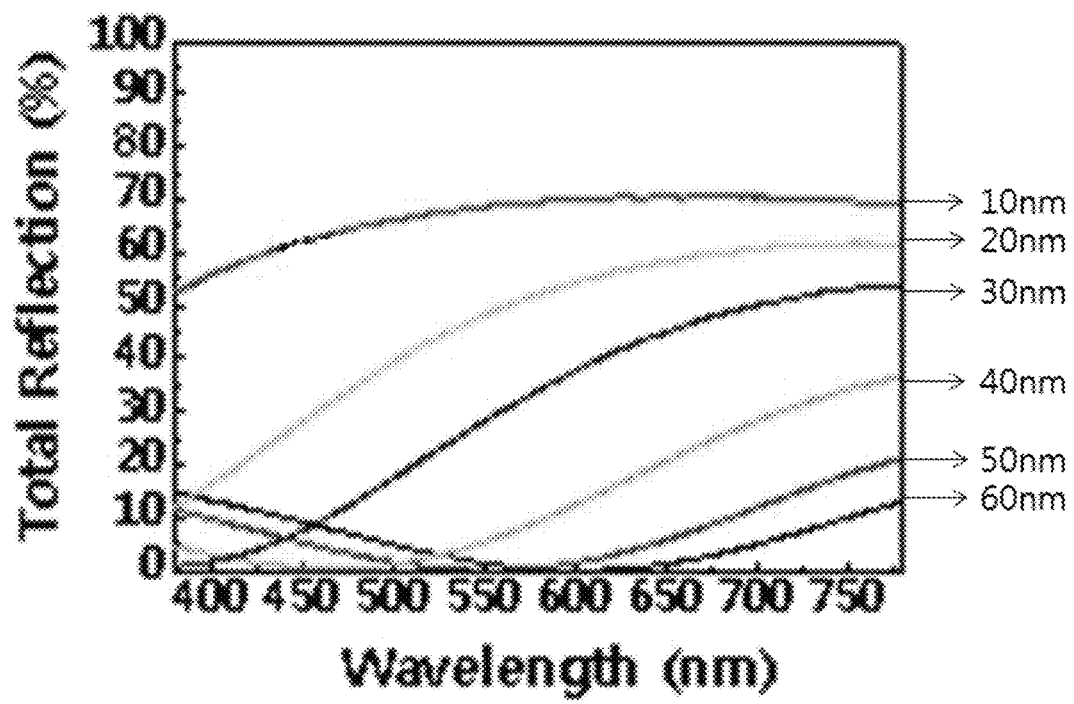
[FIG. 31]
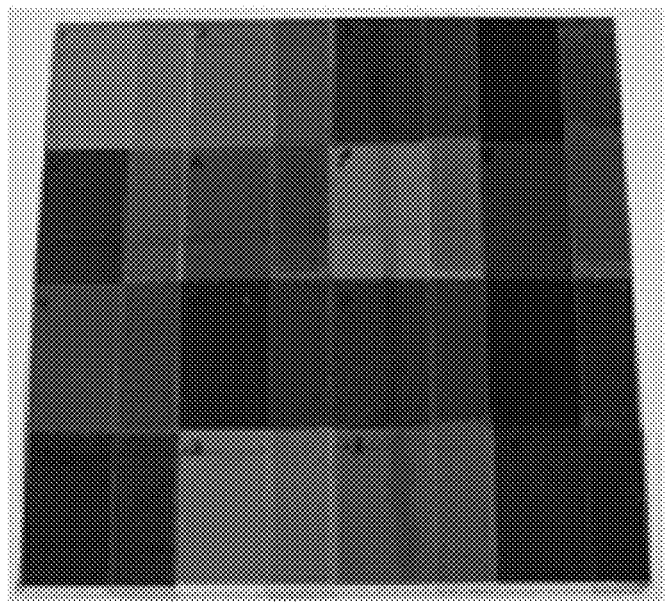

[FIG. 32]
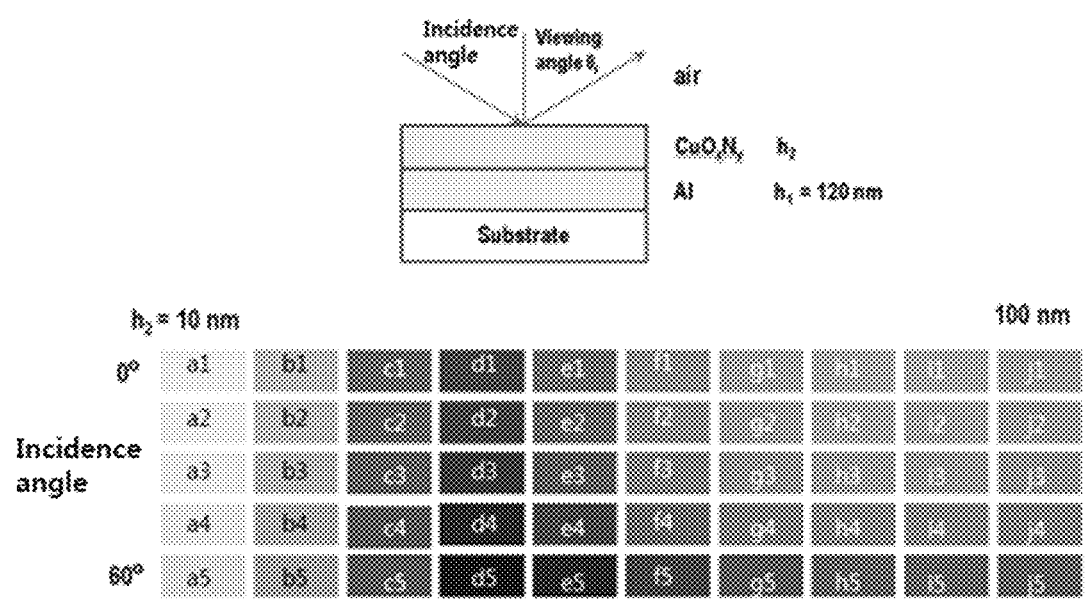

[FIG. 33]
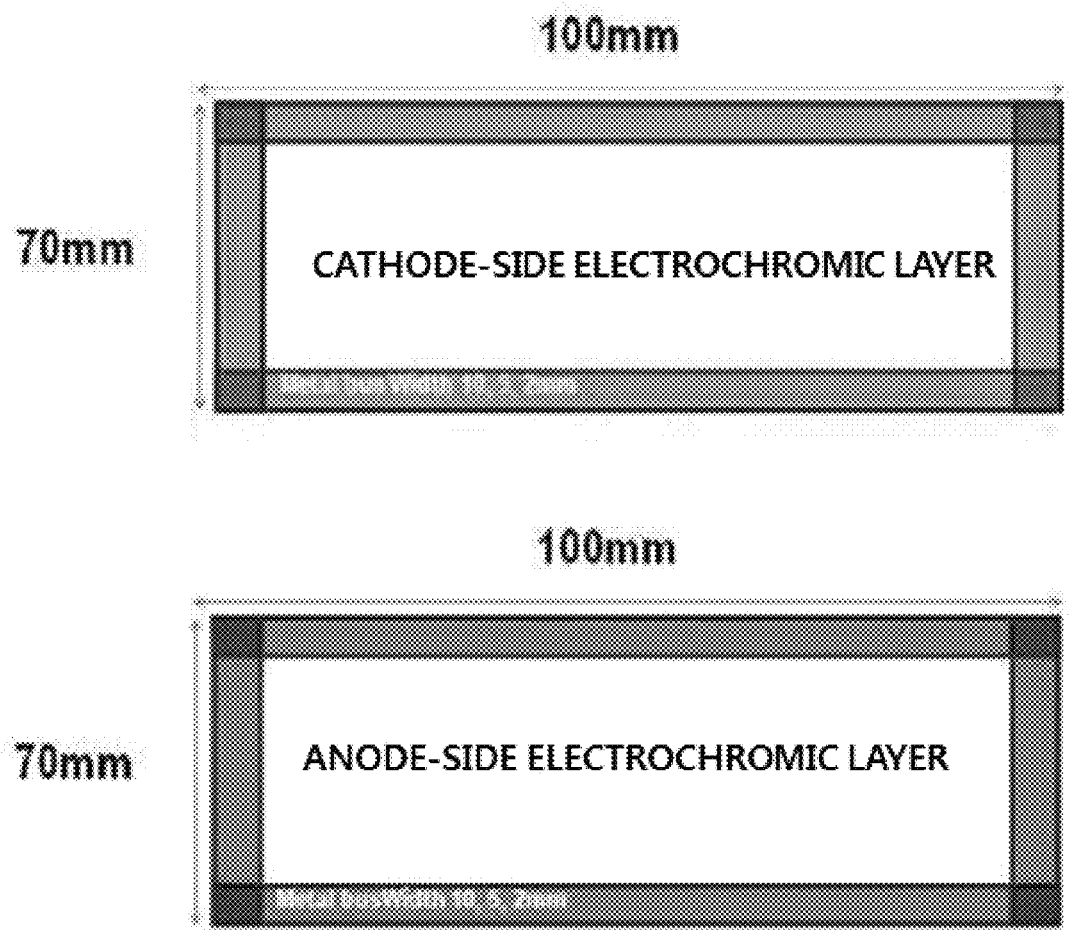

DECORATION MEMBER AND METHOD FOR PRODUCING SAME

CROSS-REFERENCE TO RELATED APPLICATIONS

This application is a U.S. national stage of international application No. PCT/KR2018/015814, filed Dec. 13, 2018, and claims priority to and the benefits of Korean Patent Application No. 10-2017-0173255, filed with the Korean Intellectual Property Office on Dec. 15, 2017, the entire contents of which are incorporated herein by reference.

TECHNICAL FIELD

The present application relates to a decoration element suitable to be used in mobile devices or electronic products, and a method for preparing the same.

BACKGROUND

For various mobile phones, mobile devices and electronic products, product designs such as colors, shapes and patterns play a major role in providing product value to customers in addition to product functions. Product preferences and prices are also dependent on designs.

As for mobile phones as one example, various colors and color senses are obtained using various methods and used in products. A method of providing colors to a mobile phone case material itself or a method of providing designs by attaching a deco film implementing colors and shapes to a case material may be included.

In existing deco films, attempts have been made to develop colors through methods such as printing and deposition. When expressing heterogeneous colors on a single surface, printing needs to be conducted two or more times, and implementation is hardly realistic when applying various colors to a three-dimensional pattern. In addition, existing deco films have fixed colors depending on a viewing angle, and even when there is a slight change, the change is limited to just a difference in the color sense.

SUMMARY

The present application is directed to providing a decoration element capable of readily obtaining various colors, capable of obtaining a number of colors on a three-dimensional pattern as necessary, and capable of providing color changes depending on a viewing angle.

One embodiment of the present application provides a decoration element comprising a color developing layer comprising a light reflective layer, and a light absorbing layer provided on the light reflective layer and comprising a convex portion or concave portion shape having an asymmetric-structured cross-section; an electrochromic device provided on any one surface of the color developing layer; and an in-mold label layer provided on the other surface of the color developing layer.

According to another embodiment of the present application, the color developing layer further comprises a color film provided on a surface opposite to the surface facing the light absorbing layer of the light reflective layer, between the light reflective layer and the light absorbing layer, or on a surface opposite to the surface facing the light reflective layer of the light absorbing layer.

According to another embodiment of the present application, the color film employs a color difference $\Delta E^*ab$, a distance in space of $L^*a^*b^*$ in a color coordinate CIE $L^*a^*b^*$ of the color developing layer, to be greater than 1 when the color film is present compared to when the color film is not provided.

According to another embodiment of the present application, a substrate is provided on a surface opposite to the surface facing the light absorbing layer of the light reflective layer, or on a surface opposite to the surface facing the light reflective layer of the light absorbing layer. The substrate may be provided on a surface opposite to the surface facing the light absorbing layer of the light reflective layer, and the color film may be provided between the substrate and the light reflective layer, or on a surface opposite to the surface facing the light reflective layer of the substrate. The substrate may be provided on a surface opposite to the surface facing the light reflective layer of the light absorbing layer, and the color film may be provided between the substrate and the light absorbing layer, or on a surface opposite to the surface facing the light absorbing layer of the substrate.

According to another embodiment of the present application, the light absorbing layer comprises two or more points with different thicknesses.

According to another embodiment of the present application, the light absorbing layer comprises two or more regions with different thicknesses.

According to another embodiment of the present application, the light absorbing layer comprises one or more regions in which an upper surface has an inclined surface with an inclined angle of greater than 0 degrees and less than or equal to 90 degrees, and the light absorbing layer comprises one or more regions having a thickness different from a thickness in any one region having the inclined surface.

According to another embodiment of the present application, the light absorbing layer comprises one or more regions with a gradually changing thickness.

According to another embodiment of the present application, the light absorbing layer comprises one or more regions in which an upper surface has an inclined surface with an inclined angle of greater than 0 degrees and less than or equal to 90 degrees, and at least one region having the inclined surface has a structure in which a thickness of the light absorbing layer gradually changes.

According to another embodiment of the present application, the light absorbing layer has an extinction coefficient (k) value of greater than 0 and less than or equal to 4, preferably 0.01 to 4 at 400 nm.

According to another embodiment of the present application, the decoration element is a deco film, a case of a mobile device, a case of an electronic product, or a commodity requiring color decoration.

According to embodiments described in the present specification, light absorption occurs in each of an entering path when external light enters through a color developing layer and in a reflection path when reflected, and since external light is reflected on each of a light absorbing layer surface and a light reflective layer surface, constructive interference and destructive interference phenomena occur between reflected light on the light absorbing layer surface and reflected light on the light reflective layer surface. Specific colors may be developed through such light absorption in the entering path and the reflection path, and the constructive interference and destructive interference phenomena. Accordingly, specific colors may be obtained according to light reflective layer material-dependent reflectance spectra and according to light absorbing layer compositions. In addition, since developed colors are thickness dependent, colors may vary depending on thicknesses even when having the same material composition.

By providing an electrochromic device on one surface of such a color developing layer, an active-type decoration element can be provided, and as a result, values of aesthetic perspectives different from existing passive-type decoration elements can be provided. Accordingly, various colors can be obtained in decoration elements of mobile phones, various mobile devices and electronic products.

Additionally, when further comprising a color film, the width of obtainable colors can be further increased much even when materials and thicknesses of the light reflective layer and the light absorbing layer are determined. The width of color changes obtained by the color filter addition may be defined by a color difference (ΔE*ab), a difference in L*a*b* before and after applying the color filter. Furthermore, a plurality of colors can be developed by allowing the light absorbing layer to have two or more points or regions with different thicknesses on the same surface, and by forming a color developing layer on a three-dimensional pattern, various colors can be obtained in the three-dimensional pattern.

In addition, when an upper surface of the light absorbing layer has at least one inclined surface, changes in the developed colors can be obtained depending on a viewing angle, and the light absorbing layer can be prepared to have two or more regions with different thicknesses using a simple process.

In addition, by comprising an in-mold label layer on one surface of the color developing layer, the decoration element according to one embodiment of the present application is capable of being used as a decoration element such as a deco film or a case of a mobile device.

BRIEF DESCRIPTION OF DRAWINGS

FIG. 1 illustrates a laminated structure of a decoration element according to an exemplary embodiment.

FIG. 2 illustrates a principle of light interference of surface reflected light and interface reflected light of a light absorbing layer and a light reflective layer according to an exemplary embodiment.

FIG. 3 illustrates a light absorbing layer and a light reflective layer according to an exemplary embodiment.

FIG. 4 to FIG. 12 illustrate various shapes of a pattern layer according to various exemplary embodiments.

FIG. 13A illustrates a pattern layer surface having a plurality of convex portions being arranged in an inversed phase structure of 180 degrees, and FIG. 13B illustrates the change in an image or logo color depending on a viewing angle.

FIGS. 14, 15, 16A and 16B illustrate upper surface structures of light absorbing layers of a decoration element according to various exemplary embodiments.

FIG. 17 to FIG. 20 are images of various decoration elements.

FIGS. 21A to 21I illustrate an upper surface structure of a light absorbing layer of a decoration element according to another exemplary embodiment.

FIG. 22 to FIG. 25 illustrate a decoration element according to various exemplary embodiments.

FIGS. 26A to 26C, 27A and 27B, 28A to 28E and 29A to 29E illustrate laminated structures of a decoration element according to various exemplary embodiments.

FIG. 30 to FIG. 32 show the development of colors being dependent on a thickness of the light absorbing layer.

FIG. 33 illustrates a cathode-side electrochromic layer and an anode-side electrochromic layer.

REFERENCE NUMERAL

100: Color Developing Layer
101: Substrate
201: Light Reflective Layer
301: Light Absorbing Layer
200: Electrochromic Device
501: Cathode
601: Cathode-Side Electrochromic Layer
701: Electrolyte Layer
801: Anode-Side Electrochromic Layer
901: Anode
1001: Substrate
401, 401a, 401b, 401c, 401d: Color Film
1101: In-Mold Label Layer

DETAILED DESCRIPTION

Hereinafter, the present disclosure will be described in detail.

In the present specification, a "point" means one position that does not have an area. In the present specification, the expression is used to indicate that a light absorbing layer has two or more points with different thicknesses.

In the present specification, a "region" represents a part having a certain area. For example, when placing the decoration element on the ground so that a light reflective layer is placed at the bottom and the light absorbing layer is placed at the top and dividing both ends of the inclined surface or both ends with the same thickness perpendicular with respect to the ground, the region having an inclined surface means an area divided by the both ends of the inclined surface, and the region with the same thickness means an area divided by the both ends with the same thickness.

In the present specification, a "surface" or "region" may be a flat surface, but is not limited thereto, and a part or all may be a curved surface. For example, structures in which a vertical cross-section shape is a part of an arc of a circle or oval, a wave structure, a zigzag or the like may be included.

In the present specification, an "inclined surface" means, when placing the decoration member on the ground so that a light reflective layer is placed at the bottom and the light absorbing layer is placed at the top, a surface having an angle formed by the upper surface with respect to the ground of greater than 0 degrees and less than or equal to 90 degrees.

In the present specification, a "thickness" of a certain layer means a shortest distance from a lower surface to an upper surface of the corresponding layer.

In the present specification, "or" represents, unless defined otherwise, a case of selectively or all comprising those listed, that is, a meaning of "and/or".

In the present specification, a "layer" means covering 70% or more of an area where the corresponding layer is present. It means covering preferably 75% or more, and more preferably 80% or more.

One embodiment of the present specification provides a decoration element comprising a color developing layer comprising a light reflective layer, and a light absorbing layer provided on the light reflective layer and comprising a convex portion or concave portion shape having an asymmetric-structured cross-section; an electrochromic device provided on any one surface of the color developing layer; and an in-mold label layer provided on the other surface of the color developing layer.

In the present specification, resistance or surface resistance may be measured in accordance with a 4-point probe method using a known surface resistor. As for the surface resistance, a resistance value (V/I) is measured by measuring a current (I) and voltage (V) using 4 probes, and by using an area (unit area, W) of a sample and a distance (L) between electrodes for measuring resistance, surface resistance is obtained (V/I×W/L), and then, a resistive corrector factor (RCF) is multiplied thereby to calculate as ohm/square, a surface resistance unit. The resistive corrector factor may be calculated using a sample size, a sample thickness and a temperature at the time of measurement, and may be calculated using the Poisson's equation. Surface resistance of the whole laminate may be measured and calculated from the laminate itself, and surface resistance of each layer may be measured before forming layers formed with remaining materials other than a target layer to measure from the whole laminate, may be measured after removing layers formed with remaining materials other than a target layer to measure from the whole laminate, or may be measured by analyzing materials of a target layer and then forming a layer under the same condition as the target layer.

Electrochromicity is a phenomenon in which optical properties of an electrochromic active material change by an electrochemical oxidation-reduction reaction, and electrochromic materials reversibly change their optical properties, that is, colors and transmittance inherent to the materials, due to electron migration or oxidation-reduction reaction when a voltage is applied from the outside. An electrochromic device using such an electrochromic phenomenon largely comprises, like a battery, an anode, a cathode and an electrolyte layer. An electrochromic layer is formed between the anode and the electrolyte, or between the cathode and the electrolyte, and when applying specific potential, ions such as H+, $Li^+$ or $Na^+$ migrate in the electrolyte, and by electrons migrating through an external circuit at the same time, electron density of the electrochromic material changes resulting in changes in the optical properties. In other words, coloring or bleaching occurs on a metal oxide surface when electrons and ions are inserted and removed by an electrochemical oxidation-reduction reaction.

According to one embodiment, the electrochromic device comprises an anode, an anode-side electrochromic layer, an electrolyte layer, a cathode-side electrochromic layer and a cathode. These may be laminated in the above-mentioned order.

On a surface opposite to the surface adjoining the anode-side electrochromic layer of the anode, or on a surface opposite to the surface adjoining the cathode-side electrochromic layer of the cathode, a substrate may be further provided.

In one embodiment of the present specification, materials known in the art may be used as the substrate. Specifically, glass, plastic or the like may be used as the substrate, however, the substrate is not limited thereto.

In one embodiment of the present specification, a transparent substrate may be used as the substrate. In one embodiment, those having transmittance of 60% or higher in a visible region may be used as the substrate. In another embodiment, those having transmittance of 80% or higher in a visible region may be used as the substrate.

In one embodiment of the present specification, glass having transmittance of 80% or higher may be used as the substrate. The substrate thickness may be selected as necessary, and for example, may be in a range of 50 μm to 200 μm.

In one embodiment of the present specification, the anode and the cathode are not particularly limited as long as they are known in the art. In one embodiment, the anode and the cathode may each independently comprise indium doped tin oxide (ITO), antimony doped tin oxide (ATO), fluorine doped tin oxide (FTO), indium doped zinc oxide (IZO), ZnO and the like, but are not limited thereto.

In one embodiment of the present specification, the anode and the cathode may each be a transparent electrode. Specifically, ITO having transmittance of 80% or higher may be used.

In one embodiment of the present specification, the anode and the cathode each independently have a thickness of 10 nm to 500 nm, for example, 100 nm or 90 nm.

In one embodiment of the present specification, the anode-side electrochromic layer may be a Prussian blue film. The Prussian blue film comprises blue $MFeFe(CN)_6$ or colorless $M2FeFe(CN)_6$. Herein, M is a monovalent alkali ion, for example, $H^+$, $Li^+$, $Na^+$ or $K^+$. It appears blue when colored, and colorless when bleached.

In one embodiment of the present specification, the anode-side electrochromic layer has a thickness of greater than or equal to 20 nm and less than or equal to 700 nm, for example, 200 nm to 400 nm or 300 nm to 400 nm.

In one embodiment of the present specification, the anode-side electrochromic layer has a refractive index of 1.8 to 2.9 at a wavelength of 550 nm.

In one embodiment of the present specification, the electrolyte layer may be prepared using materials and methods known in the art. Specifically, a pentaerythritol triacrylate (PETA) monomer, 1 M or higher $LiClO_4$, polycarbonate (PC) and the like may be used, however, the electrolyte layer is not limited thereto.

In one embodiment, the electrolyte layer may comprise a lithium salt, a plasticizer, an oligomer, a monomer, an additive, a radical initiator and the like. The oligomer used in the present application needs to have compatibility with the plasticizer.

In one embodiment of the present specification, the electrolyte layer may be formed using a method of, for example, coating an electrolyte solution on a first release film, then bonding a second release film thereto, and UV curing the result to form an electrolyte film. The prepared electrolyte film may be bonded to the anode-side electrochromic layer and the cathode-side electrochromic layer after removing the first release film and the second release film from the electrolyte film.

As the first release film and the second release film, materials known in the art may be used.

The electrolyte solution may have viscosity of 10 cps to 100,000 cps, and 1,000 cps to 5,000 cps based on 25° C. When viscosity of the electrolyte solution satisfies the above-mentioned range, coating processability is excellent, and by preventing mixing process and defoaming process defects, film-type coating may be readily conducted.

In one embodiment of the present specification, thicknesses of the electrolyte layer may be each independently from 10 μm to 500 μm, for example, 50 μm to 100 μm.

In one embodiment of the present specification, the cathode-side electrochromic layer comprises an oxide comprising tungsten (W).

In one embodiment of the present specification, the cathode-side electrochromic layer comprises an oxide comprising tungsten (W), and may further comprise chromium (Cr), manganese (Mn), niobium (Nb) or the like.

In one embodiment of the present specification, the cathode-side electrochromic layer may comprise a thin film comprising an oxide comprising tungsten (W). In one embodiment, the thin film may have density of 1 g/cm³ to 4 g/cm³.

In one embodiment of the present specification, the oxide comprising tungsten (W) may be represented by a chemical formula of $WO_z$, and z is a real number of greater than or equal to 1 and less than or equal to 3.

In one embodiment, the oxide comprising tungsten (W) is tungsten trioxide ($WO_3$).

In one embodiment of the present specification, the cathode-side electrochromic layer has a thickness of greater than or equal to 10 nm and less than or equal to 1 μm, for example, 300 nm to 400 nm.

In one embodiment of the present specification, the cathode-side electrochromic layer may be formed using methods known in the art.

The anode-side electrochromic layer and the cathode-side electrochromic layer may each further comprise a metal bus bar at the edge. A material of the metal bus bar may be formed with metals with high conductivity, and silver, copper, aluminum and the like may be used. A thickness of the metal bus bar may be set to be the same as the thickness of the electrochromic layer, and a width of the metal bus bar may be formed to 1 mm to 10 mm, however, the thickness and the width are not limited thereto.

FIG. 1 illustrates a laminated structure of a decoration element according to one embodiment of the present application. FIG. 1 illustrates a decoration element comprising a color developing layer (100) and an electrochromic device (200). The color developing layer (100) comprises a substrate (101), a light reflective layer (201) and a light absorbing layer (301). The electrochromic device (200) comprises a cathode (501), a cathode-side electrochromic layer (601), an electrolyte layer (701), an anode-side electrochromic layer (801), an anode (901) and a substrate (1001). In addition, an in-mold label layer (1101) is provided on the other surface of the color developing layer. FIG. 1 illustrates a structure in which the substrate (101) is provided on the light reflective layer (201) side of the color developing layer (100), however, the substrate (101) may not be included, or may be provided on a surface opposite to the surface adjoining the light absorbing layer (201) of the light reflective layer (301). In addition, FIG. 1 illustrates a structure in which the substrate (1001) is provided on the anode (901) side of the electrochromic device (200), however, an additional substrate may also be provided on the cathode (501) side, or the substrate (1001) may not be included. FIG. 1 illustrates a structure in which the cathode (501), the cathode-side electrochromic layer (601), the electrolyte layer (701), the anode-side electrochromic layer (801) and the anode (901) are consecutively laminated on the color developing layer, however, the structure is not limited thereto. For example, a structure in which the anode (901), the anode-side electrochromic layer (801), the electrolyte layer (701), the cathode-side electrochromic layer (601) and the cathode (501) are consecutively laminated on the color developing layer is also included in the scope of the present disclosure.

FIG. 33 illustrates a structure in which a metal bus bar is provided at the edge of the anode-side electrochromic layer and the cathode-side electrochromic layer. In FIG. 33, a width and a height of the electrochromic layer are illustrated as 100 mm and 70 mm, respectively, however, this is just an example, and does not limit the scope of the present application. For example, a width and a height of the electrochromic layer may be determined depending on the size of a finally required decoration element, and, for example, when the decoration element is intended to be used as a case used for a mobile phone, the width and the height may be determined by the size of the mobile phone.

According to the embodiments, light absorption occurs in an entering path and a reflection path of light in the light absorbing layer, and by the light reflecting on each of a surface of the light absorbing layer and an interface of the light absorbing layer and the light reflective layer, the two reflected lights go through constructive or destructive interference. In the present specification, the light reflected on the surface of the light absorbing layer may be expressed as surface reflected light, and the light reflected on the interface of the light absorbing layer and the light reflective layer may be expressed as interface reflected light. A mimetic diagram of such a working principle is illustrated in FIG. 2. FIG. 2 illustrates a structure in which a substrate (101) is provided on a light reflective layer (201) side, however, the structure is not limited to such a structure, and as for the substrate (101) location, the substrate may be disposed on other locations as described above.

Through FIG. 3, the light absorbing layer and the light reflective layer are described. In the decoration element of FIG. 3, each layer is laminated in order of a $L_{i-1}$ layer, a $L_i$ layer and a $L_{i+1}$ layer based on a light entering direction, an interface $I_i$ is located between the $L_{i-1}$ layer and the $L_{i+1}$ layer, and an interface $I_{i+1}$ is located between the $L_i$ layer and the $L_{i+1}$ layer.

When irradiating light having a specific wavelength in a direction perpendicular to each layer so that thin film interference does not occur, reflectance at the interface $I_i$ may be expressed by the following Mathematical Equation 1.

[Mathematical Equation 1]

$$\frac{[n_i(\lambda) - n_{i-1}(\lambda)]^2 + [k_i(\lambda) - k_{i-1}(\lambda)]^2}{[n_i(\lambda) + n_{i-1}(\lambda)]^2 + [k_i(\lambda) + k_{i-1}(\lambda)]^2}$$

In Mathematical Equation 1, $n_i(\lambda)$ means a refractive index depending on the wavelength ($\lambda$) of the $i^{th}$ layer, and $k_i(\lambda)$ means an extinction coefficient depending on the wavelength ($\lambda$) of the $i^{th}$ layer. The extinction coefficient is a measure capable of defining how strongly a subject material absorbs light at a specific wavelength, and the definition is the same as a definition to provide later.

Using Mathematical Equation 1, when a sum of reflectance for each wavelength at the interface $I_i$ calculated at each wavelength is $R_i$, $R_i$ is as in the following Mathematical Equation 2.

[Mathematical Equation 2]

$$R_i = \frac{\sum_{\lambda=380\,nm}^{\lambda=780\,nm} \frac{[n_i(\lambda) - n_{i-1}(\lambda)]^2 + [k_i(\lambda) + k_{i-1}(\lambda)]^2}{[n_i(\lambda) - n_{i-1}(\lambda)]^2 + [k_i(\lambda) + k_{i-1}(\lambda)]^2} \Delta\lambda}{\sum_{\lambda=380\,nm}^{\lambda=780\,nm} \Delta\lambda}$$

According to another embodiment of the present application, when the light absorbing layer comprises a pattern, the pattern may have a symmetric structure, an asymmetric structure or a combination thereof.

According to one embodiment, the light absorbing layer may further comprise a symmetric-structured pattern. As the symmetric structure, a prism structure, a lenticular lens structure and the like are included.

According to another embodiment of the present application, the light absorbing layer may comprise an asymmetric-structured pattern.

In one embodiment of the present specification, the light absorbing layer comprises a convex portion or concave portion shape having an asymmetric-structured cross-section.

In one embodiment of the present specification, the light absorbing layer comprises a convex portion shape having an asymmetric-structured cross-section.

In one embodiment of the present specification, the light absorbing layer comprises a concave portion shape having an asymmetric-structured cross-section.

In one embodiment of the present specification, the light absorbing layer comprises a convex portion shape having an asymmetric-structured cross-section and a concave portion shape having an asymmetric-structured cross-section.

In the present specification, the "cross-section" means a surface when cutting the convex portion or concave portion in any one direction. For example, the cross-section may mean, when placing the decoration member on the ground, a surface when cutting the convex portion or concave portion in a direction parallel to the ground or a direction perpendicular to the ground. In the surface of the convex portion or concave portion shape of the light absorbing layer of the decoration member according to the embodiment, at least one of the cross-sections in a direction perpendicular to the ground has an asymmetric structure.

In the present specification, the "asymmetric-structured cross-section" means a structure in which a figure formed with the borders of the cross-section does not have line symmetry or point symmetry. Line symmetry refers to having a property of overlapping when mirroring a certain figure centering on a straight line. Point symmetry refers to, when a certain figure rotates 180 degrees based on one point, having a symmetrical property completely overlapping the original figure. Herein, the borders of the asymmetric-structured cross-section may be a straight line, a curved line or a combination thereof.

In one embodiment of the present specification, in the convex portion or concave portion shape having an asymmetric-structured cross-section, at least one cross-section comprises two or more sides having different inclined angles, different curvatures, or different side shapes. For example, when two sides among the sides forming at least one cross-section have different inclined angles, different curvatures, or different side shapes, the convex portion or concave portion has an asymmetric structure.

As described above, the decoration member may develop dichroism by the convex portion or concave portion having an asymmetric-structured cross-section included in the surface of the light absorbing layer. Dichroism means different colors being observed depending on a viewing angle. Colors may be expressed by CIE $L^*a^*b^*$, and a color difference may be defined using a distance ($\Delta E^*ab$) in the $L^*a^*b^*$ space. Specifically, the color difference is $\Delta E \cdot ab = \sqrt{(\Delta L)^2 + (\Delta a)^2 + (\Delta b)^2}$, and within a range of $0 < \Delta E^*ab < 1$, an observer may not recognize the color difference [reference document: Machine Graphics and Vision 20(4):383-411]. Accordingly, dichroism may be defined by $\Delta E^*ab > 1$ in the present specification.

In one embodiment of the present specification, the decoration element has dichroism of $\Delta E^*ab > 1$. Specifically, a color difference $\Delta E^*ab$, a distance in $L^*a^*b^*$ space in a color coordinate CIE $L^*a^*b^*$ of the whole decoration element, may be greater than 1.

In one embodiment of the present specification, the color developing layer has dichroism of $\Delta E^*ab > 1$. Specifically, a color difference $\Delta E^*ab$, a distance in $L^*a^*b^*$ space in a color coordinate CIE $L^*a^*b^*$ of the color developing layer, may be greater than 1.

In one embodiment of the present specification, the shape of the convex portion or concave portion comprises a first inclined surface and a second inclined surface having different inclined angles.

In one embodiment of the present specification, in the shape of the convex portion or concave portion, at least one cross-section comprises a first inclined side and a second inclined side having different inclined angles. Shapes of the first inclined side and the second inclined side are the same as or different from each other, and are each a straight-line shape or a curved-line shape.

In one embodiment of the present specification, the borders of the asymmetric-structured cross-section are a straight line, a curved line or a combination thereof.

FIG. 4 presents the first inclined side and the second inclined side having a straight-line shape. Each convex portion shape comprises a first area (D1) comprising a first inclined side and a second area (D2) comprising a second inclined side. The first inclined side and the second inclined side have a straight-line shape. An angle (c3) formed by the first inclined side and the second inclined side may be from 75 degrees to 105 degrees. An angle (c1) formed by the first inclined side and the ground (substrate) and an angle (C2) formed by the second inclined side and the ground are different. For example, a combination of c1 and c2 may be 20 degrees/80 degrees, 10 degrees/70 degrees or 30 degrees/70 degrees.

FIGS. 5A and 5B illustrate the first inclined side or the second inclined side having a curved-line shape. The cross-section of the light absorbing layer has a convex portion shape, and the cross-section of the convex portion shape comprises a first area (E1) comprising a first inclined side and a second area (E2) comprising a second inclined side. Any one or more of the first inclined side and the second inclined side may have a curved-line shape. For example, the first inclined side and the second inclined side may both have a curved-line shape, or the first inclined side may have a straight-line shape, and the second inclined side may have a curved-line shape. When the first inclined side has a straight-line shape and the second inclined side has a curved-line shape, the angle c1 may be larger than the angle c2. FIGS. 5A and 5B illustrate the first inclined side having a straight-line shape and the second inclined side having a curved-line shape. The angle formed by the inclined side having a curved-line shape with the ground may be calculated from, when drawing an arbitrary straight line from a point where the inclined side touching the ground to a point where the first inclined side adjoins the second inclined side, an angle formed by the straight line and the ground. The curved-line-shaped second inclined side may have a different curvature depending on the light absorbing layer height, and the curved line may have a radius of curvature. The radius of curvature may be 10 times or less than the width (E1+E2) of the convex portion shape. FIG. 5A shows a radius of curvature of the curved line being twice the width of the convex portion shape, and FIG. 5B shows a radius of curvature of the curved line being the same as the width of the convex portion shape. A ratio of the part (E2) having a curvature with respect to the width (E1+E2) of the convex portion may be 90% or less. FIGS. 5A and 5B illustrate a ratio of the part (E2) having a curvature with respect to the width (E1+E2) of the convex portion being 60%.

In the present specification, the inclined angle of the inclined side may be treated the same as the inclined angle of the inclined surface.

In the present specification, unless mentioned otherwise, the "side" may be a straight line, but is not limited thereto, and a part or all may be a curved line. For example, the side may comprise a structure of a part of an arc of a circle or oval, a wave structure or a zigzag.

In the present specification, when the side comprises a part of an arc of a circle or oval, the circle or oval may have a radius of curvature. The radius of curvature may be defined by, when converting an extremely short section of a curved line into an arc, the radius of the arc.

In the present specification, the inclined angle of the convex portion may mean an angle formed by an inclined surface of the convex portion and a horizontal surface of the light absorbing layer. Unless particularly mentioned otherwise in the present specification, the first inclined surface may be defined as a left inclined surface of the convex portion, and the second inclined surface may mean a right inclined surface of the convex portion in the drawings.

In the present specification, unless mentioned otherwise, the "inclined side" means, when placing the decoration member on the ground, a side having an angle formed by a side with respect to the ground being greater than 0 degrees and less than or equal to 90 degrees. Herein, when the side is a straight line, an angle formed by the straight line and the ground may be measured. When the side comprises a curved line, an angle formed by, when placing the decoration member on the ground, the ground and a straight line connecting a point of the side closest to the ground and a point of the side farthest from the ground in a shortest distance may be measured.

In the present specification, unless mentioned otherwise, the "inclined surface" means, when placing the decoration member on the ground, a surface having an angle formed by a surface with respect to the ground being greater than 0 degrees and less than or equal to 90 degrees. Herein, when the surface is a flat surface, an angle formed by the flat surface and the ground may be measured. When the surface comprises a curved surface, an angle formed by, when placing the decoration member on the ground, the ground and a straight line connecting a point of the surface closest to the ground and a point of the surface farthest from the ground in a shortest distance may be measured.

In the present specification, unless mentioned otherwise, the "inclined angle" is an angle formed by, when placing the decoration member on the ground, the ground and a surface or side forming the light absorbing layer, and is greater than 0 degrees and less than or equal to 90 degrees. Alternatively, it may mean an angle formed by the ground and a segment (a'-b') made when connecting a point (a') where a surface or side forming the light absorbing layer adjoins the ground and a point (b') where a surface or side forming the light absorbing layer is farthest from the ground.

In the present specification, unless mentioned otherwise, the "curvature" means a degree of changes in the slope of the tangent at continuous points of a side or surface. As the change in the slope of the tangent at continuous points of a side or surface is larger, the curvature is high.

In the present specification, the convex portion may be a convex portion unit shape, and the concave portion may be a concave portion unit shape. The convex portion unit shape or the concave portion unit shape means a shape comprising two inclined sides (first inclined side and second inclined side), and is not a shape comprising three or more inclined sides. When referring to FIG. 8, the convex portion (P1) of the circle C1 is one convex portion unit shape comprising a first inclined side and a second inclined side. However, the shape included in the circle C2 comprises two convex portion unit shapes. The first inclined side may be defined as a left inclined side of the convex portion or concave portion, and the second inclined side may mean a right inclined side of the convex portion or concave portion.

In one embodiment of the present specification, an angle formed by the first inclined surface and the second inclined surface may be in a range of 80 degrees to 100 degrees. Specifically, the angle may be 80 degrees or greater, 83 degrees or greater, 86 degrees or greater or 89 degrees or greater, and may be 100 degrees or less, 97 degrees or less, 94 degrees or less or 91 degrees or less. The angle may mean an angle of a vertex formed by the first inclined surface and the second inclined surface. When the first inclined surface and the second inclined surface do not form a vertex with each other, the angle may mean an angle of a vertex in a state forming a vertex by virtually extending the first inclined surface and the second inclined surface.

In one embodiment of the present specification, a difference between the inclined angle of the first inclined surface and the inclined angle of the second inclined surface of the may be in a range of 30 degrees to 70 degrees in the convex portion. The difference between the inclined angle of the first inclined surface and the inclined angle of the second inclined surface may be, for example, 30 degrees or greater, 35 degrees or greater, 40 degrees or greater or 45 degrees or greater, and may be 70 degrees or less, 65 degrees or less, 60 degrees or less or 55 degrees or less. Having the difference between the inclined angles of the first inclined surface and the second inclined surface in the above-mentioned range may be advantageous in terms of obtaining direction-dependent color expression. In other words, when a difference in the inclined angle of the inclined side is in the above-mentioned range, thicknesses of the light absorbing layers each formed on the first inclined side and the second inclined side may become different, and as a result, dichroism may become greater when looking at the decoration element from the same direction (refer to the following Table 1).

TABLE 1

| Difference in Inclined Angle of First Inclined Side and Second Inclined Side | Side of First Inclined Side | | | Side of Second Inclined Side | | | |
|---|---|---|---|---|---|---|---|
| | $L_1^*$ | $a_1^*$ | $b_1^*$ | $L_2^*$ | $a_2^*$ | $b_2^*$ | $\Delta E^*ab$ |
| 0 | 25.6 | 1.2 | −1.3 | 23.8 | 1.4 | −1.8 | 1.9 |
| 10 | 25.6 | 1.2 | −1.3 | 24.0 | 1.4 | −2.6 | 2.1 |
| 20 | 25.6 | 1.2 | −1.3 | 24.9 | 0.8 | −2.4 | 1.4 |
| 30 | 34.6 | 1.1 | −5.7 | 23.8 | 1.1 | −1.1 | 11.7 |
| 40 | 34.0 | 1.1 | −5.7 | 23.8 | 1.1 | −1.1 | 11.2 |
| 50 | 38.1 | 0.8 | −6.3 | 24.0 | 1.1 | −1.1 | 15.0 |
| 60 | 39.2 | 1.2 | −6.9 | 23.8 | 1.1 | −1.1 | 16.5 |

In one embodiment of the present specification, the cross-section of the convex portion or concave portion shape may be a polygonal shape of triangle or square. FIG. 6 presents the convex portion shape being a square shape. The square shape may be a general square shape, and is not particularly limited as long as an inclined angle of each inclined side is different. The square shape may be a shape left after partially cutting a triangle. For example, a trapezoid in which one pair of opposite sides is parallel, or a square shape in which a pair of opposite sides parallel to each other is not present may be included. The convex portion shape comprises a first area (F1) comprising a first inclined side, a second area (F2) comprising a second inclined side and a third area (F3) comprising a third inclined side. The third inclined side may or may not be parallel to the ground. For example, when the square shape is a trapezoid, the third inclined side is parallel to the ground. Any one or more of the first inclined side to the third inclined side may have a curved-line shape, and descriptions on the curved-line shape are the same as the descriptions provided above. The combined length of F1+F2+3 may be defined as a pitch of the convex portion shape.

FIG. 9 presents a method of determining the shape of the convex portion shape. For example, the convex portion shape may have a shape removing a specific area of the ABO1 triangle shape. A method of determining the removed specific area is as follows. Details on the inclined angles c1 and c2 are the same as the descriptions provided above.

1) An arbitrary point P1 on an AO1 segment dividing the AO1 segment in a ratio of L1:2 is set.

2) An arbitrary point P2 on a BO1 segment dividing the BO1 segment in a ratio of m1:m2 is set.

3) An arbitrary point O2 on an AB segment dividing the AB segment in a ratio of n1:n2 is set.

4) An arbitrary point P3 on an O1O2 segment dividing the O2O1 segment in a ratio of o1:o2 is set.

Herein, the ratios of L1:L2, m1:m2, n1:n2 and o1:o2 are the same as or different from each other, and may be each independently from 1:1000 to 1000:1.

5) The area formed by the P1O1P2P3 polygon is removed.

6) The shape formed by the ABP2P3P1 polygon is employed as the cross-section of the convex portion.

The convex portion shape may be modified to various forms by adjusting the ratios of L1:L2, m1:m2, n1:n2 and o1:o2. For example, the height of the pattern may increase when the L1 and m1 increase, and the height of the concave portion formed on the convex portion may decrease when the o1 increases, and by adjusting the ratio of n1, the position of the lowest point of the concave portion formed on the convex portion may be adjusted to be closer to any one side of the inclined sides of the convex portion.

When the ratios of L1:L2, m1:m2 and o1:o2 are all the same, the cross-section shape may be a trapezoidal shape (FIGS. 10A and 10B). The height of the trapezoid (ha, hb) may vary by adjusting the ratio of L1:L2. For example, FIG. FIG. 10A illustrates a convex portion shape prepared when the L1:L2 ratio is 1:1, and FIG. 10B illustrates a convex portion shape prepared when the L1:L2 ratio is 2:1, and the m1:m2 ratio is 1:1 and the o1:o2 ratio is 1:8.

In one embodiment of the present specification, the convex portion or concave portion shape comprises two or more of the convex portion or concave portion shapes. By having two or more of the convex portion or concave portion shapes as above, dichroism may become greater. Herein, the two or more convex portion or concave portion shapes may have a form of repeating identical shapes, however, shapes different from each other may be included. This is shown in FIGS. 11, 12, 13A and 13B.

FIG. 11 illustrates two or more convex portion shapes that are different from each other being alternately arranged. A shape in which a second convex portion (P2) having a smaller height compared to the convex portion is disposed between the convex portions (P1) may be obtained. Hereinafter, the convex portion stated prior to the second convex portion may be referred to as a first convex portion.

FIG. 12 illustrates a concave portion being included between two or more convex portion shapes. The light absorbing layer surface may have a shape further comprising a concave portion (P3) having a smaller height compared to the convex portion on a tip portion (pointed part) of the convex portion (P1). Such a decoration element may exhibit an effect of an image color softly changing depending on a viewing angle.

In FIGS. 13A and 13B, each shape may be arranged in an inversed phase structure. Like this, the light absorbing layer comprises a convex portion or concave portion shape, and each of the shapes may be arranged in an inversed phase structure.

Specifically, as illustrated in FIG. 13A, the light absorbing layer surface may have a shape of a plurality of convex portions being arranged in an inversed phase structure of 180 degrees. Specifically, the light absorbing layer surface may comprise a first area (C1) in which the second inclined surface has a larger inclined angle compared to the first inclined surface, and a second area (C2) in which the second inclined surface has a larger inclined angle compared to the first inclined surface. In one example, the convex portion included in the first area may be referred to as a first convex portion (P1), and the convex portion included in the second area may be referred to as a fourth a convex portion (P4). As for heights, widths, inclined angles and an angle formed by the first and the second inclined surfaces of the first convex portion (P1) and the fourth convex portion (P4), descriptions provided in the convex portion (P1) section may be used in the same manner.

As illustrated in FIG. 13B, it may be constituted that any one area of the first area and the second area corresponds to an image or a logo, and the other area corresponds to a background part. Such a decoration element may exhibit an effect of an image or logo color softly changing depending on a viewing angle. In addition, a decorative effect of colors of an image or logo part and a background part looking switched depending on a viewing direction.

The first area and the second area may each comprise a plurality of convex portions. Widths and the number of convex portions of the first area and the second area may be properly controlled depending on the size of a target image or logo.

In one embodiment of the present specification, the light absorbing layer comprises two or more convex portion shapes, and may further comprise a flat portion in all or a part between each convex portion shape.

As illustrated in FIGS. 7A and 7B, a flat portion (G1) may be included between each convex portion of the light absorbing layer. The flat portion means an area where a convex portion is not present. Other than the light absorbing layer further comprising a flat portion, descriptions on the remaining constituents (D1, D2, c1, c2, c3, first inclined side and second inclined side) are the same as the descriptions provided above. Meanwhile, the combined length of D1+D2+G1 is defined as a pitch of the pattern, which is different from the width of the pattern described above.

A height (H1) of the convex portion (P1) may be from 5 μm to 30 μm. Having the convex portion height in the above-mentioned range may be advantageous in a production process aspect. In the present specification, the convex portion height may mean a shortest distance between the highest part and the lowest part of the convex portion based on the horizontal surface of the light absorbing layer. As for the descriptions relating to the height of the convex portion, the same numerical range may also be used in the depth of the concave portion described above.

A width (W1) of the convex portion (P1) may be from 10 μm to 90 μm. Having the convex portion width in the above-mentioned range may be advantages in a process aspect in processing and forming a pattern. The width of the convex portion (P1) may be, for example, 10 μm or greater, 15 μm or greater, 20 μm or greater or 25 μm or greater, and may be 90 μm or less, 80 μm or less, 70 μm or less, 60 μm or less, 50 μm or less, 40 μm or less or 35 μm or less. The descriptions relating to the width may be used in the concave portion described above as well as the convex portion.

A distance between the convex portions (P1) may be from 0 μm to 20 μm. The distance between the convex portions in the present specification may mean, in two adjacent convex portions, a shortest distance between a point where one convex portion ends and a point where another convex portion starts. When properly maintaining the distance between the convex portions, a phenomenon of a reflection area looking dark due to shading when a relatively bright color is to be obtained may be improved when looking at the decoration element from an inclined surface side of the convex portion having a larger inclined angle. Between the convex portions, a second convex portion with a smaller height compared to the convex portion may be present as to be described later. The descriptions relating to the distance may be used in the concave portion described above as well as the convex portion.

A height (H2) of the second convex portion (P2) may be in a range of ⅕ to ¼ of the height (H1) of the first convex portion (P1). For example, a height difference (H1−H2) between the first convex portion and the second convex portion may be from 10 μm to 30 μm. A width (W2) of the second convex portion may be from 1 μm to 10 μm. Specifically, the width (W2) of the second convex portion may be 1 μm or greater, 2 μm or greater, 3 μm or greater, 4 μm or greater or 4.5 μm or greater, and may be 10 μm or less, 9 μm or less, 8 μm or less, 7 μm or less, 6 μm or less or 5.5 μm or less.

In one embodiment of the present specification, the second convex portion may have two inclined surfaces (S3, S4) having different inclined angles. An angle (a4) formed by the two inclined surfaces of the second convex portion may be from 20 degrees to 100 degrees. Specifically, the angle (a4) may be 20 degrees or greater, 30 degrees or greater, 40 degrees or greater, 50 degrees or greater, 60 degrees or greater, 70 degrees or greater, 80 degrees or greater or 85 degrees or greater, and may be 100 degrees or less or 95 degrees or less. An inclined angle difference (a6−a5) between both inclined surfaces of the second convex portion may be from 0 degrees to 60 degrees. The inclined angle difference (a6−a5) may be 0 degrees or greater, 10 degrees or greater, 20 degrees or greater, 30 degrees or greater, 40 degrees or greater or 45 degrees or greater, and may be 60 degrees or less or 55 degrees or less. The second convex portion having a dimension in the above-mentioned range may be advantageous in terms of forming bright color by increasing light inflow from a side surface having a large inclined surface angle.

In one embodiment of the present specification, a height (H3) of the concave portion (P3) may be from 3 μm to 15 μm. Specifically, a height (H3) of the concave portion (P3) may be 3 μm or greater, and may be 15 μm or less, 10 μm or less or 5 μm or less. The concave portion may have two inclined surfaces (S5, S6) having different inclined angles. An angle (a7) formed by the two inclined surfaces of the concave portion may be from 20 degrees to 100 degrees. Specifically, the angle (a7) may be 20 degrees or greater, 30 degrees or greater, 40 degrees or greater, 50 degrees or greater, 60 degrees or greater, 70 degrees or greater, 80 degrees or greater or 85 degrees or greater, and may be 100 degrees or less or 95 degrees or less. An inclined angle difference (a9−a8) between both inclined surfaces of the concave portion may be from 0 degrees to 60 degrees. The inclined angle difference (a9−a8) may be 0 degrees or greater, 10 degrees or greater, 20 degrees or greater, 30 degrees or greater, 40 degrees or greater or 45 degrees or greater, and may be 60 degrees or less or 55 degrees or less. The concave portion having a dimension in the above-mentioned range may be advantageous in terms that a color sense may be added on the inclined interface.

According to one embodiment, the light absorbing layer comprises a pattern in which an upper surface has a cone-shaped protrusion or groove. The cone shape comprises a shape of a circular cone, an oval cone or a polypyramid. Herein, the shape of the bottom surface of the polypyramid comprises a triangle, a square, a star shape having 5 or more protruding points, and the like. The cone shape may have a shape of a protrusion formed on an upper surface of the light absorbing layer, or a shape of a groove formed on an upper surface of the light absorbing layer. The protrusion has a triangular cross-section, and the groove has an inverted triangular cross-section. A lower surface of the light absorbing layer may also have the same shape as the upper surface of the light absorbing layer.

According to one embodiment, the cone-shaped pattern may have an asymmetric structure. For example, when rotating the cone-shaped pattern 360 degrees based on the vertex of the cone and observing from the upper surface, dichroism is difficult to be developed from the pattern when three or more same shapes are present. However, when rotating the cone-shaped pattern 360 degrees based on the vertex of the cone and observing from the upper surface, dichroism may be developed when two or less identical shapes are present. FIG. 14 illustrates an upper surface of the cone shape, and a) all illustrates a symmetric-structured cone shape, and b) illustrates an asymmetric-structured cone shape.

The symmetric-structured cone shape has a structure in which a cone-shaped bottom surface is a circle or a regular polygon having the same side lengths, and the vertex of the cone is present on a vertical line of the center of gravity of the bottom surface. However, the asymmetric-structured cone shape has a structure in which, when observing from the upper surface, the position of the vertex of the cone is present on a vertical line of a point that is not the center of gravity of the bottom surface, or has a structure in which the bottom surface is an asymmetric-structured polygon or oval. When the bottom surface is an asymmetric-structured polygon, at least one of the sides and the angles of the polygon may be designed to be different from the rest.

For example, as in FIG. 15, the position of the vertex of the cone may be changed. Specifically, when designing the vertex of the cone to be located on a vertical line of the center of gravity (O1) of the bottom surface when observing from the upper surface as in the first drawing of FIG. 15, 4 identical structures may be obtained when rotating 360 degrees based on the vertex of the cone (4-fold symmetry). However, the symmetric structure is broken by designing the vertex of the cone on a position (O2) that is not the center of gravity (O1) of the bottom surface. When employing a length of one side of the bottom surface as x, migration distances of the vertex of the cone as a and b, a height of the cone shape, a length of a line vertically connecting from the vertex of the cone (O1 or O2) to the bottom surface, as h, and an angle formed by the bottom surface and a side surface of the cone as θn, cosine values for Surface 1, Surface 2, Surface 3 and Surface 4 of FIG. 15 may be obtained as follows.

$$\cos(\Theta 1) = \frac{\left(\frac{x}{2}\right)}{sqrt\left(h^2 + \left(\frac{x}{2}\right)^2\right)}$$

$$\cos(\Theta 2) = \frac{\left(\frac{x}{2}\right)}{sqrt\left(h^2 + \left(\frac{x}{2}\right)^2\right)}$$

$$\cos(\Theta 3) = \frac{\left(\frac{x}{2} - a\right)}{sqrt\left(h^2 + \left(\frac{x}{2} - a\right)^2\right)}$$

$$\cos(\Theta 4) = \frac{\left(\frac{x}{2} - b\right)}{sqrt\left(h^2 + \left(\frac{x}{2} - b\right)^2\right)}$$

Herein, θ1 and θ2 are the same, and therefore, there is no dichroism. However, θ3 and θ4 are different, and |θ3−θ4| means a color difference between two colors (ΔE*ab), and therefore, dichroism may be obtained. Herein, |θ3−θ4|>0. As above, how much the symmetric structure is broken, that is, a degree of asymmetry, may be represented quantitatively using an angle formed by the horizontal cross-section with respect to the ground and a side surface of the cone, and the value representing such a degree of asymmetry is proportional to a color difference of dichroism.

FIGS. 16A and 16B illustrate a surface having a convex portion shape in which the highest point has a line shape. FIG. 16A illustrates a pattern having a convex portion developing no dichroism and FIG. 16B illustrates a pattern having a convex portion developing dichroism. An X-X' cross-section of FIG. 16A is an isosceles triangle or an equilateral triangle, and a Y-Y' cross-section of FIG. 16B is a triangle having different side lengths.

In one embodiment of the present specification, the light absorbing layer has a surface of a convex portion shape in which the highest point has a line shape or a concave portion shape in which the lowest point has a line shape. The line shape may be a straight-line shape or a curved-line shape, and may comprise both a curve and a straight line, or a zigzag shape. This is illustrated in FIG. 17 to FIG. 19. When observing the surface of the convex portion shape in which the highest point has a line shape or the concave portion shape in which the lowest point has a line shape from a surface side of the convex portion or concave portion shape, having only one identical shape when rotating 360 degrees based on the center of gravity of the horizontal cross-section with respect to the ground of the convex portion or the concave portion is advantageous in developing dichroism.

In one embodiment of the present specification, the light absorbing layer has a surface of a convex portion or concave portion shape in which a cone-type tip portion is cut. FIG. 20 illustrates images obtaining, when placing a decoration element on the ground, an inversed trapezoidal concave portion in which a cross-section perpendicular to the ground is asymmetric. Such an asymmetric cross-section may have a trapezoidal or inversed trapezoidal shape. In this case, dichroism may also be developed by the asymmetric-structured cross-section.

In addition to the structures illustrated above, various surfaces of convex portion or concave portion shapes as in FIGS. 21A to 21E may be obtained.

In the present specification, unless mentioned otherwise, the "surface" may be a flat surface, but is not limited thereto, and a part or all may be a curved surface. For example, the shape of a cross-section in a direction perpendicular to the surface may comprise a structure of a part of an arc of a circle or oval, a wave structure or a zigzag.

According to another embodiment of the present application, the light absorbing layer may comprise two or more regions with different thicknesses.

Examples of the structure according to the embodiment are illustrated in FIG. 22 and FIG. 23. FIG. 22 and FIG. 23 illustrate a structure in which a substrate (101), a light reflective layer (201) and a light absorbing layer (301) are laminated (substrate is not included in FIG. 22). FIG. 22 and FIG. 23 illustrate a structure in which the substrate (101) is provided on the light reflective layer (201) side, however, the structure is not limited thereto, and the substrate (101) may also be provided on the light absorbing layer (301) side. According to FIG. 22 and FIG. 23, the light absorbing layer (301) has two or more points with different thicknesses. According to FIG. 22, thicknesses in A point and B point are different in the light absorbing layer (301). According to FIG. 23, thicknesses in C region and D region are different in the light absorbing layer (301).

According to another embodiment of the present application, the light absorbing layer comprises one or more regions in which an upper surface has an inclined surface with an inclined angle of greater than 0 degrees and less than or equal to 90 degrees, and the light absorbing layer comprises one or more regions having a thickness different from a thickness in any one region having the inclined surface.

Surface properties such as an upper surface slope of the light reflective layer may be the same as an upper surface of the light absorbing layer. For example, by using a deposition method when forming the light absorbing layer, the upper surface of the light absorbing layer may have the same slope as the upper surface of the light reflective layer.

FIG. 24 illustrates a structure of a decoration element having a light absorbing layer in which an upper surface has an inclined surface. The structure is a structure laminating a substrate (101), a light reflective layer (201) and a light absorbing layer (301), and thickness t1 in E region and thickness t2 in F region are different in the light absorbing layer (301).

FIG. 24 relates to a light absorbing layer having inclined surfaces facing each other, that is, having a structure with a triangle cross-section. In the structure of the pattern having inclined surfaces facing each other as in FIG. 24, a thickness of the light absorbing layer may be different in two surfaces of the triangle structure even when progressing deposition under the same condition. Accordingly, a light absorbing layer having two or more regions with different thicknesses may be formed using just one process. As a result, developed colors may become different depending on the thickness of the light absorbing layer. Herein, the thickness of the light reflective layer does not affect changes in the color when it is a certain thickness or greater.

FIG. 24 illustrates a structure in which a substrate (101) is provided on a light reflective layer (201) side, however, the structure is not limited thereto, and as described above, the substrate (101) may also be disposed on other locations. In addition, in FIG. 24, the surface adjoining the light reflective layer (201) of the substrate (101) is a flat surface, however, the surface adjoining the light reflective layer (201) of the substrate (101) may have a pattern having the same slope as an upper surface of the light reflective layer (201). This may cause a difference in the thickness of the light absorbing layer due to a difference in the slope of the pattern of the substrate. However, the present disclosure is not limited thereto, and even when the substrate and the light absorbing layer are prepared to have different slopes using different deposition methods, the dichroism described above may be obtained by having the thickness of the light absorbing layer being different on both sides of the pattern.

According to another embodiment of the present application, the light absorbing layer comprises one or more regions with a gradually changing thickness. FIG. 25 illustrates a structure in which a thickness of the light absorbing layer gradually changes.

According to another embodiment of the present application, the light absorbing layer comprises one or more regions in which an upper surface has an inclined surface with an inclined angle of greater than 0 degrees and less than or equal to 90 degrees, and at least one region having the inclined surface has a structure in which a thickness of the light absorbing layer gradually changes. FIG. 25 illustrates a structure of a light absorbing layer comprising a region in which an upper surface has an inclined surface. In FIG. 25, both G region and H region have a structure in which an upper surface of the light absorbing layer has an inclined surface, and a thickness of the light absorbing layer gradually changes.

According to one embodiment, the light absorbing layer comprises a first region having a first inclined surface with an inclined angle in a range of 1 degree to 90 degrees, and may further comprise a second region in which an upper surface has an inclined surface with a different slope direction or a different inclined angle from the first inclined surface, or an upper surface is horizontal. Herein, thicknesses in the first region and the second region may be different from each other in the light absorbing layer.

According to another embodiment, the light absorbing layer comprises a first region having a first inclined surface with an inclined angle in a range of 1 degree to 90 degrees, and may further comprise two or more regions in which an upper surface has an inclined surface with a different slope direction or a different inclined angle from the first inclined surface, or an upper surface is horizontal. Herein, thicknesses in the first region and the two or more regions may all be different from each other in the light absorbing layer.

According to another embodiment of the present application, the color developing layer comprises a color film provided on a surface opposite to the surface facing the light absorbing layer of the light reflective layer, between the light reflective layer and the light absorbing layer, or on a surface opposite to the surface facing the light reflective layer of the light absorbing layer.

The color film is not particularly limited as long as it has a color difference $\Delta E^*ab$, a distance in space of $L^*a^*b^*$ in a color coordinate CIE $L^*a^*b^*$ of the color developing layer, of greater than 1 when the color film is present compared to when the color film is not provided.

Colors may be expressed by CIE $L^*a^*b^*$, and a color difference may be defined using a distance ($\Delta E^*ab$) in the $L^*a^*b^*$ space. Specifically, the color difference is $\Delta E\cdot ab = \sqrt{(\Delta L)^2 + (\Delta a)^2 + (\Delta b)^2}$, and within a range of $0 < \Delta E^*ab < 1$, an observer may not recognize the color difference [reference document: Machine Graphics and Vision 20(4):383-411]. Accordingly, a color difference obtained by the color film addition may be defined by $\Delta E^*ab > 1$ in the present specification.

FIGS. 26A to 26C illustrate various aspects of a color developing layer comprising a color film. FIG. 26A illustrates a structure in which a light reflective layer (201), a light absorbing layer (301) and a color film (401) are consecutively laminated, FIG. 26B illustrates a structure in which a light reflective layer (201), a color film (401) and a light absorbing layer (301) are consecutively laminated, and FIG. 26C illustrates a structure in which a color film (401), a light reflective layer (201) and a light absorbing layer (301) are consecutively laminated.

The color film may also perform a role of a substrate. For example, those that may be used as a substrate may be used as a color film by adding a dye or a pigment thereto.

The substrate may be provided on a surface opposite to the surface facing the light absorbing layer of the light reflective layer (FIG. 27A); or on a surface opposite to the surface facing the light reflective layer of the light absorbing layer (FIG. 27B).

For example, when the substrate is provided on a surface opposite to the surface facing the light absorbing layer of the light reflective layer, and the color film is located on a surface opposite to the surface facing the light absorbing layer of the light reflective layer, the color film may be provided between the substrate and the light reflective layer; or on a surface opposite to the surface facing the light reflective layer of the substrate. As another example, when the substrate is provided on a surface opposite to the surface facing the light reflective layer of the light absorbing layer, and the color film is located on a surface opposite to the surface facing the light reflective layer of the light absorbing layer, the color film may be provided between the substrate and the light absorbing layer; or on a surface opposite to the surface facing the light absorbing layer of the substrate.

According to another embodiment of the present application, the substrate is provided on a surface opposite to the surface facing the light absorbing layer of the light reflective layer, and the color film is further provided. FIG. 28A illustrates a structure in which the color film (401) is provided on a surface opposite to the light reflective layer (201) side of the light absorbing layer (301), FIG. 28B illustrates a structure in which the color film (401) is provided between the light absorbing layer (301) and the light reflective layer (201), FIG. 28C illustrates a structure in which the color film (401) is provided between the light reflective layer (201) and the substrate (101), and FIG. 28D illustrates a structure in which the color film (401) is provided on a surface opposite to the light reflective layer (201) side of the substrate (101). FIG. 28E illustrates a structure in which the color films (401a, 401b, 401c, 401d) are provided on a surface opposite to the light reflective layer (201) side of the light absorbing layer (301), between the light absorbing layer (301) and the light reflective layer (201), between the light reflective layer (201) and the substrate (101), and on a surface opposite to the light reflective layer (201) side of the substrate (101), respectively, however, the structure is not limited thereto, and 1 to 3 of the color films (401a, 401b, 401c, 401d) may not be included.

According to another embodiment of the present application, the substrate is provided on a surface opposite to the surface facing the light reflective layer of the light absorbing layer, and the color film is further provided. FIG. 29A illustrates a structure in which the color film (401) is provided on a surface opposite to the light absorbing layer (301) side of the substrate (101), FIG. 29B illustrates a structure in which the color film (401) is provided between the substrate (101) and the light absorbing layer (301), FIG. 29C illustrates a structure in which the color film (401) is provided between the light absorbing layer (301) and the light reflective layer (201), and FIG. 29D illustrates a structure in which the color film (401) is provided on a surface opposite to the light absorbing layer (301) side of the light reflective layer (201). FIG. 29E illustrates a structure in which the color films (401a, 401b, 401c, 401d) are provided on a surface opposite to the light absorbing layer (201) side of the substrate (101), between the substrate (101) and the light absorbing layer (301), between the light absorbing layer (301) and the light reflective layer (201), and on a surface opposite to the light absorbing layer (201) side of the light reflective layer (201), respectively, however, the structure is not limited thereto, and 1 to 3 of the color films (401a, 401b, 401c, 401d) may not be included.

In the structures such as FIG. 28B and FIG. 29C, the light reflective layer may reflect light entering through the color film when the color film has visible light transmittance of greater than 0%, and therefore, colors may be obtained by laminating the light absorbing layer and the light reflective layer.

In the structures such as FIG. 28C, FIG. 28D and FIG. 29D, light transmittance of the colors developed from the color film of the light reflective layer (201) may be 1% or greater, preferably 3% or greater and more preferably 5% or greater so that changes in the color difference obtained by the color film addition may be recognized. This is due to the fact that light transmitted in such a visible light transmittance range may be mixed with colors obtained by the color film.

The color film may be provided as one sheet, or as a laminate of 2 sheets or more that are the same or different types.

As the color film, those capable of developing target colors by combining with colors developed from the laminated structure of the light reflective layer and the light absorbing layer described above may be used. For example, color films expressing colors by one, two or more types of pigments and dyes being dispersed into a matrix resin may be used. Such a color film may be formed by directly coating a composition for forming a color film on a color film-providable location, or a method of preparing a color film by coating a composition for forming a color film on a separate substrate or using a known molding method such as casting or extrusion, and then disposing or attaching the color film on a color film-providable location may be used. As the coating method, wet coating or dry coating may be used.

The pigment and the dye capable of being included in the color film may be selected from among those capable of obtaining target colors from a final decoration member, and known in the art, and one, two or more types among pigments and dyes such as red-based, yellow-based, purple-based, blue-based or pink-based may be used. Specifically, dyes such as perinone-based red dyes, anthraquinone-based red dyes, methane-based yellow dyes, anthraquinone-based yellow dyes, anthraquinone-based purple dyes, phthalocyanine-based blue dyes, thioindigo-based pink dyes or isoxindigo-based pink dyes may be used either alone or as a combination. Pigments such as carbon black, copper phthalocyanine (C.I. Pigment Blue 15:3), C.I. Pigment Red 112, Pigment blue or isoindoline yellow may be used either alone or as a combination. As such dyes or pigments, those commercially available may be used, and for example, materials manufactured by Ciba ORACET or Chokwang Paint Ltd. may be used. Types of the dyes or pigments and colors thereof are for illustrative purposes only, and various known dyes or pigments may be used, and more diverse colors may be obtained therefrom.

As the matrix resin included in the color film, materials known as materials of transparent films, primer layers, adhesive layers or coating layers may be used, and the matrix resin is not particularly limited to these materials. For example, various materials such as acryl-based resins, polyethylene terephthalate-based resins, urethane-based resins, linear olefin-based resins, cycloolefin-based resins, epoxy-based resins or triacetylcellulose-based resins may be selected, and copolymers or mixtures of the materials illustrated above may also be used.

When the color film is disposed closer to the location observing a decoration member than the light reflective layer or the light absorbing layer as in, for example, the structures of FIGS. 28(a) and (b), and FIGS. 29(a), (b) and (c), light transmittance of the colors developed by the color film from the light reflective layer, the light absorbing layer or the laminated structure of the light reflective layer and the light absorbing layer may be 1% or greater, preferably 3% or greater and more preferably 5% or greater. As a result, target colors may be obtained by combining colors developed from the color film and colors developed from the light reflective layer, the light absorbing layer or the laminated structure thereof.

The thickness of the color film is not particularly limited, and those skilled in the art may select and set the thickness as long as it is capable of obtaining target colors. For example, the color film may have a thickness of 500 nm to 1 mm.

The light absorbing layer may implement various colors depending on a refractive index (n), an extinction coefficient (k) and a thickness (t). FIG. 30 shows reflectance by wavelength depending on a thickness of the light absorbing layer, and FIG. 31 shows colors obtained therefrom. Specifically, FIG. 30 is a reflectance simulation graph by CuO deposition thickness of CuO/Cu, and is a material prepared while varying a CuO thickness from 10 nm to 60 nm under the same deposition condition.

FIG. 32 shows a simulation result indicating that different colors are observed depending on a viewing angle. FIG. 32 is a simulation result of CuON/Al. In FIG. 32, the thickness of the light absorbing layer increases from 10 nm to 100 nm by 10 nm, and an incident angle is adjusted from 0 degrees to 60 degrees at a 15 degrees interval. Through such a simulation result, it is seen that, in the structure according to an embodiment of the present application, various colors may be obtained by adjusting a thickness of a light absorbing layer and an inclined angle of an upper surface. By being provided with a color film in addition thereto, more diverse colors may be obtained.

In FIG. 32, L*a*b* coordinate values of A1 to A5 are each (91,3,5), L*a*b* coordinate values of B1 to B5 are (74,14,8), (74,14,8), (72,15,10), (69,15,11) and (66,16,13), respectively, L*a*b* coordinate values of C1 to C5 are (46,22,−11), (45,22,−10), (43,25,−9), (40,28,−4) and (42,30,6), respectively, L*a*b* coordinate values of D1 to D5 are (36,−12,−22), (35,−11,−23), (30,−7,−24), (20,6,−26) and (18,38,−12), respectively, L*a*b* coordinate values of E1 to E5 are (49,−20,−7), (48,−20,−7), (43,−20,−8), (34,−18,39) and (18,7,−10), respectively, L*a*b* coordinate values of F1 to F5 are (60,−10,4), (59,−10,4), (55,−11,4), (47,−11,4) and (31,−4,3), respectively, L*a*b* coordinate values of G1 to G5 are (66,−4,10), (65,−4,10), (62,−4,10), (54,−5,11) and (40,−2,10), respectively, L*a*b* coordinate values of H1 to H5 are (69,1,11), (68,1,12), (64,1,13), (58,1,14) and (44,2, 13), respectively, L*a*b* coordinate values of I1 to I5 are (68,5,11), (67,5,11), (64,5,12), (58,6,14) and (41,7,14), respectively, and L*a*b* coordinate values of J1 to J5 are (66,8,8), (65,8,8), (62,8,10), (56,9,11) and (43,11,11), respectively.

The light reflective layer is not particularly limited as long as it is a material capable of reflecting light, however, light reflectance may be determined depending on the material, and for example, colors are readily expressed at 50% or greater. Light reflectance may be measured using an ellipsometer.

The light absorbing layer preferably has a refractive index (n) of 0 to 8 at 400 nm, and the refractive index may be from 0 to 7, may be from 0.01 to 3, and may be from 2 to 2.5. The refractive index (n) may be calculated by sin θ1/sin θ2 (θ1 is an angle of light incident on a surface of the light absorbing layer, and θ2 is a refraction angle of light inside the light absorbing layer).

The light absorbing layer preferably has a refractive index (n) of 0 to 8 at 380 nm to 780 nm, and the refractive index may be from 0 to 7, may be from 0.01 to 3, and may be from 2 to 2.5.

The light absorbing layer may have an extinction coefficient (k) of greater than 0 and less than or equal to 4 at 400 nm, and the extinction coefficient (k) is preferably from 0.01 to 4, may be from 0.01 to 3.5, may be from 0.01 to 3, and may be from 0.1 to 1. The extinction coefficient (k) is −λ/4πI (dI/dx) (herein, a value multiplying λ/4π with dI/I, a reduced fraction of light intensity per a path unit length (dx), for example 1 m, in the light absorbing layer, and herein, λ is a wavelength of light).

The light absorbing layer may have an extinction coefficient (k) of greater than 0 and less than or equal to 4 at 380 nm to 780 nm, and the extinction coefficient (k) is preferably from 0.01 to 4, may be from 0.01 to 3.5, may be from 0.01 to 3, and may be from 0.1 to 1.

The extinction coefficient (k) is in the above-mentioned range at 400 nm, preferably in the whole visible wavelength region of 380 nm to 780 nm, and therefore, a role of the light absorbing layer may be performed in the visible range.

For example, using a method of absorbing light by adding a dye to a resin, and using a material having an extinction coefficient as described above lead to different light absorption spectra. When absorbing light by adding a dye to a resin, an absorption wavelength band is fixed, and only a phenomenon of varying an absorption amount depending on the changes in the coating thickness occurs. In addition, in order to obtain a target light absorption amount, changes in the thickness of at least a few micrometers or more are required to adjust the light absorption amount. On the other hand, in materials having an extinction coefficient, a wavelength band absorbing light changes even when the thickness changes by a several to tens of nanometer scale.

According to one embodiment, the light reflective layer may be a metal layer, a metal oxide layer, a metal nitride layer, a metal oxynitride layer or an inorganic material layer. The light reflective layer may be formed in a single layer, or may be formed in a multilayer of two or more layers.

As one example, the light reflective layer may be a single layer or a multilayer comprising one, two or more types of materials selected from among indium (In), titanium (Ti), tin (Sn), silicon (Si), germanium (Ge), aluminum (Al), copper (Cu), nickel (Ni), vanadium (V), tungsten (W), tantalum (Ta), molybdenum (Mo), neodymium (Nd), iron (Fe), chromium (Cr), cobalt (Co), gold (Au) and silver (Ag), or oxides, nitrides or oxynitrides thereof, and one, two or more types of materials among carbon and carbon composites. For example, the light reflective layer may comprise alloys of two or more selected from among the above-mentioned materials, or oxides, nitrides or oxynitrides thereof. According to another embodiment, the light reflective layer may allow highly resistant reflective layer by being prepared using an ink comprising carbon or carbon composites. Carbon black, CNT and the like may be included as the carbon or carbon composites. The ink comprising carbon or carbon composites may comprise above-described materials, or oxides, nitrides or oxynitrides thereof, and for example, oxides of one, two or more types selected from among indium (In), titanium (Ti), tin (Sn), silicon (Si), germanium (Ge), aluminum (Al), copper (Cu), nickel (Ni), vanadium (V), tungsten (W), tantalum (Ta), molybdenum (Mo), neodymium (Nd), iron (Fe), chromium (Cr), cobalt (Co), gold (Au) and silver (Ag) may be included. A curing process may be further carried out after printing the ink comprising carbon or carbon composites.

When the light reflective layer comprises two or more types of materials, the two or more types of materials may be formed using one process, for example, a method of deposition or printing, however, a method of first forming a layer using one or more types of materials, and then additionally forming a layer thereon using one or more types of materials may be used. For example, a light reflective layer may be formed by forming a layer through depositing indium or tin, then printing an ink comprising carbon, and then curing the result. The ink may further comprise oxides such as titanium oxides or silicon oxides.

According to one embodiment, the light absorbing layer may be a single layer, or a multilayer of two or more layers.

The light absorbing layer may be formed with materials having an extinction coefficient (k) at 400 nm, preferably at 380 nm to 780 nm, that is, materials having an extinction coefficient of greater than 0 and less than or equal to 4, preferably 0.01 to 4. For example, the light absorbing layer may comprise one, two or more selected from the group consisting of metals, metalloids, and oxides, nitrides, oxynitrides and carbides of metals or metalloids. The oxides, nitrides, oxynitrides or carbides of metals or metalloids may be formed under a deposition condition and the like set by those skilled in the art. The light absorbing layer may also comprise the same metals, metalloids, alloys or oxynitrides of two or more types as the light reflective layer.

For example, the light absorbing layer may be a single layer or a multilayer comprising one, two or more types of materials selected from among indium (In), titanium (Ti), tin (Sn), silicon (Si), germanium (Ge), aluminum (Al), copper (Cu), nickel (Ni), vanadium (V), tungsten (W), tantalum (Ta), molybdenum (Mo), neodymium (Nd), iron (Fe), chromium (Cr), cobalt (Co), gold (Au) and silver (Ag), or oxides, nitrides or oxynitrides thereof. As specific examples, the light absorbing layer comprises one, two or more types selected from among copper oxides, copper nitrides, copper oxynitrides, aluminum oxides, aluminum nitrides, aluminum oxynitrides and molybdenum titanium oxynitrides.

According to one embodiment, the light absorbing layer comprises silicon (Si) or germanium (Ge).

The light absorbing layer formed with silicon (Si) or germanium (Ge) may have a refractive index (n) of 0 to 8, or 0 to 7 at 400 nm, and may have an extinction coefficient (k) of greater than 0 and less than or equal to 4, preferably 0.01 to 4, and the extinction coefficient (k) may be from 0.01 to 3 or from 0.01 to 1.

According to another embodiment, the light absorbing layer comprises one, two or more types selected from among copper oxides, copper nitrides, copper oxynitrides, aluminum oxides, aluminum nitrides, aluminum oxynitrides and molybdenum titanium oxynitrides. In this case, the light absorbing layer may have a refractive index (n) of 1 to 3, for example, 2 to 2.5 at 400 nm, and an extinction coefficient (k) of greater than 0 and less than or equal to 4, preferably 0.01 to 2.5, preferably 0.2 to 2.5 and more preferably 0.2 to 0.6.

According to one embodiment, the light absorbing layer is AlOxNy (x>0, y>0).

According to another embodiment, the light absorbing layer may be AlOxNy (0≤x≤1.5, 0≤y≤1).

According to another embodiment, the light absorbing layer is AlOxNy (x>0, y>0), and with respect to the total number of atoms 100%, the number of each atom satisfies the following equation.

$$1 < \frac{(Al)at \times 3}{(O)at \times 2 + (N)at \times 3} < 2$$

According to one embodiment, the light absorbing layer may be formed with materials having an extinction coefficient (k) at 400 nm, preferably at 380 nm to 780 nm, and for example, the light absorbing layer/light reflective layer may be formed with materials such as CuO/Cu, CuON/Cu, CuON/Al, AlON/Al, AlN/AL/AlON/Cu or AlN/Cu.

According to one embodiment, the thickness of the light reflective layer may be determined depending on target colors in a final structure, and for example, may be 1 nm or greater, preferably 25 nm or greater, for example, 50 nm or greater, and preferably 70 nm or greater.

According to one embodiment, the thickness of the light absorbing layer may be from 5 nm to 500 nm, for example, from 30 nm to 500 nm.

According to one embodiment, a difference in the thickness by the region of the light absorbing layer is from 2 nm to 200 nm, and may be determined depending on a target color difference.

According to one embodiment, a substrate provided on a lower surface of the light reflective layer or an upper surface of the light absorbing layer may be further included. Surface properties such as an upper surface slope of the substrate may be the same as upper surfaces of the light reflective layer and the light absorbing layer. By forming the light reflective layer and the light absorbing layer using a deposition method, the substrate, the light reflective layer and the light absorbing layer may have an inclined surface with the same angle. For example, the structure as above may be obtained by forming an inclined surface or a three-dimensional structure on an upper surface of a substrate, and depositing a light reflective layer and a light absorbing layer thereon in this order, or depositing a light absorbing layer and a light reflective layer in this order.

According to one embodiment, forming an inclined surface or a three-dimensional structure on the substrate surface may be carried out using a method of forming a pattern on an ultraviolet curable resin and curing the result using ultraviolet rays, or processing with laser. According to one embodiment, the decoration element may be a deco film or a case of a mobile device. The decoration element may further comprise a gluing layer as necessary.

Materials of the substrate are not particularly limited, and ultraviolet curable resins known in the art may be used when forming an inclined surface or a three-dimensional structure using methods as above.

On the light absorbing layer, a protective layer may be further provided.

According to one embodiment, an adhesive layer may be further provided on an opposite surface of the substrate provided with the light absorbing layer or the light reflective layer. This adhesive layer may be an optically clear adhesive (OCA) layer. As necessary, a peel-off layer (release liner) may be further provided on the adhesive layer for protection.

Deposition such as a sputtering method has been described as an example of forming the light reflective layer and the light absorbing layer in the present specification, however, various methods of preparing a thin film may be used as long as constitutions and properties according to embodiments described in the present specification are obtained. For example, a vapor deposition method, a chemical vapor deposition (CVD) method, wet coating and the like may be used.

In one embodiment of the present application, an in-mold label layer is provided on the other surface of the color developing layer. The in-mold label layer may comprise one or more types of acrylonitrile butadiene styrene (ABS), polymethyl methacrylate (PMMA), polycarbonate (PC), acrylonitrile-styrene (AS), styrene-acrylonitrile (SAN), polyethylene terephthalate (PET) and polypropylene (PP). In addition, the in-mold label layer may further comprise a print layer.

Generally, a method of introducing a label into a mold, and, while forming a plastic film in the mold, forming a label on the plastic film is called an in-mold labeling process. The in-mold labeling process has advantages of reducing storage space of a product being manufactured and shipping instantly since there is no need to attach a label after plastic film molding or to store a molded product during manufacturing.

In one embodiment of the present application, the print layer of the in-mold label layer may comprise information such as letters or images. More specifically, the print layer of the in-mold label layer may comprise a printed matter such as a bar code, a manufacturer, a sales company name, a character, a product name or a usage instruction.

The in-mold label layer may be prepared using in-mold molding methods known in the art. More specifically, the in-mold label layer may be prepared using in-mold molding methods such as blow molding, injection molding or differential pressure molding, however, the method is not limited thereto.

In one embodiment of the present application, the in-mold label layer and the color developing layer may be adhered to each other by an adhesive layer such as an optically clear adhesive (OCA) layer. More specifically, the in-mold label layer and the color developing layer may be adhered to each other by an in-mold labeling process in which the in-mold label layer material is injected onto the adhesive-coated color developing layer.

Hereinafter, the present disclosure will be described in more detail with reference to examples. However, the following examples are for illustrative purposes only, and are not to limit the scope of the present disclosure.

EXAMPLE

Example 1

On a fabric having color primer coating on one surface a PET film, a UV molding layer (asymmetric pattern) was formed. On the PET substrate, a light reflective layer (Al, thickness 100 nm) and a light absorbing layer {aluminum oxynitride (AlON), thickness 40 nm} were deposited to develop color, and a light-shielding printing process using screen printing (black 4 degree DM (waterproof) ink 1 degree) was applied.

After coating an adhesive on the PET film, the result was molded and trimmed, placed in a mold and injected for integration (in-mold labeling). As a resin material, ABS was used.

On the other surface of the PET film, a film in which an ITO layer having a thickness of 80 nm and a $WO_3$ layer having a thickness of 250 nm are consecutively laminated was prepared. The basic color when bleached was employed to be gold. The half-cell manufactured as above was placed in a bath comprising an electrolyte liquid ($LiClO_4$ (1 M)+propylene carbonate (PC)), a potentiostat device was prepared, and a voltage of −1 V was applied for 50 seconds to color $WO_3$.

With a gel polymer electrolyte (GPE) as a medium, the film comprising the ITO layer and the $WO_3$ layer of the half-cell was bonded with a Prussian blue (PB)/ITO laminate to prepare a film having a laminated structure of Al/AlON/ITO/$WO_3$/GPE/PB/ITO.

A rate of color change was measured while repeatedly applying a bleaching voltage and a coloring voltage to the prepared film at a constant cycle. The bleaching voltage and the coloring voltage per one cycle were each applied for 50 seconds at a magnitude of (±)1.2 V. The light absorbing layer may comprise a prism shape having an asymmetric-structured cross-section.

Comparative Example 1

Without performing the integration (in-mold labeling) process of Example 1 and without forming the light reflective layer and the light absorbing layer, ITO having a thickness of 210 nm and a $WO_3$ layer having a thickness of 250 nm were consecutively laminated on a PET substrate. After that, a transmissive electrochromic film (ITO/$WO_3$/GPE/PB/ITO) was prepared through the same lamination process as in Example 1. A rate of color change was measured on the film prepared as above in the same manner as in Example 1.

Resistance, coloring time and bleaching time of the films prepared in Example 1 and Comparative Example 1 are shown in the following Table 2.

TABLE 2

|  | Resistance ($\Omega/\square$) | Coloring Time (sec) | Bleaching Time (sec) |
| --- | --- | --- | --- |
| Example 1 | 30 | 32 | 31 |
| Comparative Example 1 | 30 | 30 | 32 |

[ITO Resistance Used in Example 1 was 30 ohm/sq]

In the experiments, resistance and time for color change (coloring time and bleaching time) were measured using methods as follows.

Resistance: surface resistance of each of the films prepared in the example and the comparative example was measured in accordance with a 4-point probe method using a known surface resistor. Surface resistance of Table 2 was measured for the light reflective layer before forming the light absorbing layer in the examples, and for the ITO in the comparative example. Surface resistance of the whole laminate is determined by resistance of the reflective layer having low surface resistance since the layers are connected in parallel. The surface resistance was measured using a measuring device of Hiresta MCP-HT450, ASP PROBE.

Time for color change: as for the coloring time, time taken to reach approximately 20% of the transmittance of a final colored state observed after time to apply potential for coloring (50 s) had passed was measured.

In addition, as for the bleaching time, time taken to reach approximately 80% of the transmittance of a final bleached state observed after time to apply potential for bleaching (50 s) had passed was measured.

The invention claimed is:

1. A decoration element comprising:
    a color developing layer comprising a light reflective layer, a light absorbing layer provided on the light reflective layer and a convex portion or concave portion, each of the convex portion and the concave portion having an asymmetric-structured cross-section;
    an electrochromic device provided on a surface of the color developing layer; and
    an in-mold label layer provided on a surface of the color developing layer opposite to the surface of the color developing layer facing the electrochromic device.

2. The decoration element of claim 1, wherein the color developing layer further comprises a color film provided: on a surface of the light reflective layer opposite to the surface of the light reflective layer facing the light absorbing layer between the light reflective layer and the light absorbing layer; or on a surface of the light absorbing layer opposite to the surface of the light absorbing layer facing the light reflective layer.

3. The decoration element of claim 1, wherein the color developing layer further comprises a substrate provided on a surface of the light reflective layer opposite to the surface of the light reflective layer facing the light absorbing layer, or on a surface opposite to the surface of the light absorbing layer facing the light reflective layer.

4. The decoration element of claim 1, wherein the electrochromic device comprises an anode, an anode-side electrochromic layer, an electrolyte layer, a cathode-side electrochromic layer and a cathode.

5. The decoration element of claim 4, wherein the electrochromic device further comprises a substrate provided on a surface of the anode opposite to the surface of the anode adjoining the anode-side electrochromic layer, or on a surface of the cathode opposite to the surface of the cathode adjoining the cathode-side electrochromic layer.

6. The decoration element of claim 1, wherein the light absorbing layer comprises two or more points with different thicknesses.

7. The decoration element of claim 1, wherein the light absorbing layer comprises one or more regions in which an upper surface has an inclined surface inclined at an angle of greater than 0 degrees and less than or equal to 90 degrees, and the light absorbing layer comprises one or more regions having a thickness different from a thickness in any one of the one or more regions having the inclined surface.

8. The decoration element of claim 1, wherein the light absorbing layer has dichroism when a color difference ΔF*ab of the color developing layer is greater than 1, and wherein the color difference ΔE*ab is a difference in color coordinates L*a*b* in a color coordinate CIE L*a*b* of the color developing layer.

9. The decoration element of claim 1, wherein an upper surface of the light absorbing layer comprises a pattern having a cone-shaped protrusion or groove; or a pattern having a protrusion in which a highest point of the protrusion has a line shape or a groove in which a lowest point of the groove has a line shape.

10. The decoration element of claim 9, wherein, when observed from an upper surface, the pattern having a cone-shaped protrusion or groove comprises two or less cone-shaped protrusions or grooves having a similar shape when the cone-shaped pattern is rotated 360 degrees around a vertex of a cone of the pattern.

11. The decoration element of claim 9, wherein, when observed from an upper surface, the pattern having a protrusion in which the highest point of the protrusion has a line shape or a groove in which the lowest point of the groove has a line shape comprises protrusions and grooves having a same shape when the pattern is rotated 360 degrees around a center of gravity of the upper surface of the pattern.

12. The decoration element of claim 1, wherein the light absorbing layer has a refractive index (n) of 0 to 8 at 400 nm.

13. The decoration element of claim 1, wherein the light absorbing layer has an extinction coefficient (k) of greater than 0 and less than or equal to 4 at 400 nm.

14. The decoration element of claim 1, wherein the in-mold label layer comprises one or more materials selected from the group consisting of acrylonitrile butadiene styrene (ABS), polymethyl methacrylate (PMMA), polycarbonate (PC), acrylonitrile-styrene (AS), styrene-acrylonitrile (SAN), polyethylene terephthalate (PET) and polypropylene (PP).

15. The decoration element of claim 1 which is a deco film or a case of a mobile device.

\* \* \* \* \*